United States Patent
Hole

(10) Patent No.: US 9,661,543 B2
(45) Date of Patent: May 23, 2017

(54) CELL CHANGE NOTIFICATION CONTROL FOR CSG CELLS

(75) Inventor: David Philip Hole, Southampton (GB)

(73) Assignee: BlackBerry Limited, Waterloo, Ontario (CA)

(*) Notice: Subject to any disclaimer, the term of this patent is extended or adjusted under 35 U.S.C. 154(b) by 775 days.

(21) Appl. No.: 13/985,809

(22) PCT Filed: Feb. 18, 2011

(86) PCT No.: PCT/EP2011/052468
§ 371 (c)(1),
(2), (4) Date: Oct. 23, 2013

(87) PCT Pub. No.: WO2012/110104
PCT Pub. Date: Aug. 23, 2012

(65) Prior Publication Data
US 2014/0036869 A1    Feb. 6, 2014

(51) Int. Cl.
*H04W 36/16* (2009.01)
*H04W 48/18* (2009.01)

(52) U.S. Cl.
CPC .......... *H04W 36/165* (2013.01); *H04W 48/18* (2013.01)

(58) Field of Classification Search
CPC ... H04W 48/18; H04W 36/165; H04W 24/02; H04W 88/005; H04W 36/22
See application file for complete search history.

(56) References Cited

U.S. PATENT DOCUMENTS

| | | | |
|---|---|---|---|
| 5,483,524 A | 1/1996 | Lev et al. | |
| 7,957,743 B2 | 6/2011 | Moe et al. | |
| 8,374,610 B2 | 2/2013 | Hole | |
| 2006/0116118 A1 | 6/2006 | Charriere et al. | |
| 2006/0146744 A1* | 7/2006 | Vasudevan | H04W 36/02 370/328 |
| 2007/0086388 A1 | 4/2007 | Kang et al. | |
| 2008/0130585 A1 | 6/2008 | Park et al. | |
| 2008/0267153 A1 | 10/2008 | Mukherjee et al. | |
| 2009/0061881 A1 | 3/2009 | Gonsa et al. | |
| 2009/0163206 A1 | 6/2009 | Adatrao et al. | |
| 2009/0291686 A1 | 11/2009 | Alpert et al. | |
| 2010/0027507 A1 | 2/2010 | Li et al. | |

(Continued)

FOREIGN PATENT DOCUMENTS

| | | |
|---|---|---|
| EP | 0933962 | 8/2009 |
| WO | 2008041115 | 4/2008 |
| WO | 2008131589 | 11/2008 |

OTHER PUBLICATIONS

3rd Generation Partnership Project; Technical Specification Group Services and System Aspects; 3GPP System Architecture Evolution: Report on Technical Options and Conclusions (Release 7), 3GPP TR 23.882, V1.4.2, (Oct. 2006).

(Continued)

*Primary Examiner* — Ian N Moore
*Assistant Examiner* — Latresa McCallum
(74) *Attorney, Agent, or Firm* — Fish & Richardson P.C.

(57) ABSTRACT

Systems and methods are provided for controlling whether a mobile station is permitted to perform a reselection to a CSG cell, and if reselection is allowed, whether a notification of cell change is required in advance. This control is based on CCN notifications for different radio access technologies.

12 Claims, 14 Drawing Sheets

(56) References Cited

U.S. PATENT DOCUMENTS

| | | |
|---|---|---|
| 2010/0061337 A1 | 3/2010 | Hallenstal et al. |
| 2010/0075680 A1 | 3/2010 | Ramachandran et al. |
| 2010/0165948 A1 | 7/2010 | Ore et al. |
| 2010/0260147 A1 | 10/2010 | Xing et al. |
| 2010/0290431 A1 | 11/2010 | Yang et al. |
| 2010/0323704 A1 | 12/2010 | Tailor et al. |
| 2011/0090857 A1 | 4/2011 | Guo |
| 2011/0105119 A1 | 5/2011 | Bienas et al. |
| 2011/0116470 A1* | 5/2011 | Arora ............... H04W 36/0016 370/331 |
| 2011/0176509 A1 | 7/2011 | Hole et al. |
| 2011/0177816 A1 | 7/2011 | Hole |
| 2011/0177817 A1* | 7/2011 | Hole ................. H04W 36/0055 455/436 |
| 2011/0274055 A1 | 11/2011 | Wager et al. |
| 2012/0135736 A1 | 5/2012 | Sebire et al. |
| 2012/0302241 A1* | 11/2012 | Klingenbrunn ....... H04W 48/16 455/436 |
| 2013/0665597 | 3/2013 | Hole |

OTHER PUBLICATIONS

3rd Generation Partnership Project; Technical Specification Group Services and System Aspects; Voice Call Continuity (VCC) between Circuit Switched (CS) and IP Multimedia Subsystem (IMS); Stage 2 (Release 7), 3GPP TS 23.206, V7.0.0, (Sep. 2006).

3rd Generation Partnership Project; Technical Specification Group GERAN; Packet-switched handover for GERAN A/Gb mode; Stage 2 (Release 6), 3GPP TS 43.129 V6.9.0 (Sep. 2006).

Non-Final office Action mailed Oct. 7, 2011, in corresponding U.S. Appl. No. 12/690,750.

3GPP TS 36.104-V9.2.0, Technical Specification Group Radio Access Network; Evolved Universal Terrestrial Radio Access (E-UTRA); Base Station (BS) radio transmission and reception, Release 9, Dec. 2009.

3GPP: 3GPP Technical Specification Mobile radio interface layer 3 specification; Radio Resource Control (RRC) protocol (Release 9) 3GPP TS44.018 V9.3.0, Dec. 1, 2009, pp. 1, 164-169, XP002624705, Retrieved from the Internet: URL: http://www.3gpp.org/ftp/Specs/archive/44_series/44.018/44018-930.zip [retrived on Feb. 1, 2011] chapter 9.1.15.

International Search Report and Written Opinion dated Mar. 22, 2011 from PCT International Application No. PCT/EP2011/050411.

Partial International Search Report dated May 11, 2011 from PCT International Application No. PCT/EP2011/050410.

LG Electronics Inc: "CSG Cell Detection" 3GPP Draft; R2-097012 CSG Cell Detection, 3rd Generation Partnership Project (3GPP), Mobile Competence Centre; 650, Route Des Ducioles, F-06921 Sophia-Antipolis Cedex; France, No. Jeju; Nov. 9, 2009, Nov. 9, 2009; XP050391385.

Partial International Search Report dated Mar. 30, 2011 from PCT International Application No. PCT/EP2011/050408.

Motorola Ltd et al.: "Definition of use of E_UTRAN_BA_IND and PSI3_Change_Mark with E-UTRAN related information and other clarifications", 3GPP Draft, GP-091730 [GP-091713] CR_44060-REL-9 E-UTRAN_BA_IND, #rd Generation Partnership Project (3GPP), Mobile Competence Centre; 650, Route Des Lucioles; F-06921 Sophia-Antipolis Cedex; France, vol. TSG GERAN, no. Vancouver; Aug. 31, 2009, Sep. 4, 2009, XP050415754.

Nokia Corporation et al: "Measurement Reporting Parameters for CSG Cells" 3GPP Draft; GP-092022_CSG_Parameters, 3rd Generation Partnership Project (3GPP), Mobile Competence Centre; 650, Route Des Lucioles; F-06921 Sophia-Antipolis Cedex; France, vol. TSG GERAN, no. Sophia, Nov. 16, 2009, Nov. 11, 2009, XP050415993.

Nokia Siemens Networks et al: "Signalling changes for CSG inbound mobility in connected mode", 3GPP Draft; FP-092023_DRAFT_CR_44060_CSG_SIGNALLING, 3rd Generation Partnership Project (3GPP), Mobile Competence Centre; 650, Route Des Lucioles; F-06921 Sophia-Antipolis Cedex; France, vol. TSG GERAN, no. Sophia, Nov. 16, 2009, Nov. 11, 2009, XP050415994.

R2-097000, "CSG inbound handover—way forward", NTT Docomo, 3GPP TSG-RAN WG2 #68, Jeju, Korea, Nov. 9-13, 2009.

GP-092382 "Working Assumptions on "Inbound Mobility to CSG Cells in Connected Mode"", (source 3GPP Geran WG2), 3GPP TSG GERAN #44, Sophia Antipolis, France, Nov. 16-20, 2009.

R2-097445 CR 36.331-0258 rev 3 "Slight revision of baseline CR capturing agreements on inbound mobility", Samsung, 3GPP TSG-RAN WG2 #68, Jeju, Korea, Nov. 9-13, 2009.

R2-097466 CR 36.331-0318 rev 1 "Introduction of network ordered SI reporting", NTT Docomo, 3GPP TSG-RAN WG2 #68, Jeju, Korea, Nov. 9-13, 2009.

GP-092023 "Signalling Changes for CSG inbound mobility in connected mode" 3GPP TSG-3GPP GERAN #44, Sophia Antipolis, France, Nov. 16-20, 2009.

3GPP TS 44.060 (latest version is v.9.2.0) "General Packet Radio Service (GPRS); Mobile Station (MS)—Base Station System (BSS) interface; Radio Link Control / Medium Access Control (RLC/MAC) protocol". Release 9, Dec. 2009.

3GPP TS 45.008: "Radio subsystem link control". (latest version is v.9.1.0), Release 9, Nov. 2009.

3GPP TS 44.018 "Mobile radio interface layer 3 specification; Radio Resource Control Protocol". (latest version is 9.3.0), Release 9, Dec. 2009.

3GPP TS 48.008 "Mobile Switching Centre—Base Station System (MSC-BSS) interface; Layer 3 specification" (latest version is 9.1.0), Release 9, Dec. 2009.

3GPP TS 43.129 Packed-switched handover for GERAN A/Gb mode; Stage 2 (defines Handover Preparation; latest version is 9.0.0), Release 9, Dec. 2009.

3GPP TS 48.018 "General Packet Radio Service (GPRS); Base Station System (BSS)—Serving GPRS Support Node (SGSN); BSS GPRS protocol (BSSGP)" (latest version is 9.0.0), Release 9, Dec. 2009.

3GPP TS 23.009-V9.0.0, Technical Specification Group Core Network and Terminals; Handover procedures, Release 9, Dec. 2009.

3GPP TS 23.008-V9.1.0, Technical Specification Group Core Network and Terminals; Organization of subscriber data, Release 9, Dec. 2009.

3GPP TS 25.304-V9.0.0, Technical Specification Group Radio Access Network; User Equipment (UE) procedures in idle mode and procedures for cell reselection in connected mode, Release 9, Dec. 2009.

3GPP TS 36.304-V9.1.0, Technical Specification Group Radio Access Network; Evolved Universal Terrestrial Radio Access (E-UTRA); User Equipment (UE) procedures in idle mode, Release 9, Dec. 2009.

XP008079910—Inter BSC-Intra MSC Handover Call Flow (Dec. 4, 2004); retrieved Dec. 13, 2005. Retrieved from the Internet: http//www.eventhelix.com/RealtimeMantra/Telecom/GSM Handover Call Flow .pdf.

Search Report issued in respect of European Application No. 11700413.5 on Oct. 4, 2013.

3GPP TS 44.060 V8.9.0 "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 8)" (Jun. 2010).

3GPP TS 45.008 V8.9.0 "3rd Generation Partnership Project; Technical Specification Group GSM/EDGE Radio Access Network; Radio subsystem link control (Release 8)" (Nov. 2010).

3GPP TS 44.018 V8.9.0 "3rd Generation Partnership Project; Technical Specification Group GSM/EDGE Radio Access Network; Mobile radio interface layer 3 specification; Radio Resource Control (RRC) protocol (Release 8)" (Dec. 2009).

Patent Cooperation Treaty, "International Search Report," issued by the International Searching Authority in connection with PCT application No. PCT/EP2011/052468, mailed Nov. 10, 2011 (3 pages).

(56) References Cited

OTHER PUBLICATIONS

Patent Cooperation Treaty, "Written Opinion of the International Searching Authority," issued by the International Searching Authority in connection with PCT/EP2011/052468, mailed Nov. 10, 2011 (8 pages).
LG Electronics Inc., "Correction on Cell Change Notification for CSG Cell," 3GPP DRAFT; GP-102032 44.060 Rev 3 Rel-10, 3rd Generaltion Partnership Project (3GPP), Mobile Competence Centre; Nov. 25, 2010, 6 pages.
Nokie Siemens Networks et al., "Addition of Packet Cell Change Order for CSG Cells," 3GPP Draft; GP-102022_CR_44060_PCCO_CSG(REL-9), 3rd Generation Partnership Project (3GPP), Mobile Competence Centre; Nov. 25, 2010, 42 pages.
"Digital Cellular Telecommunications system (Phase 2+); General Packet Radio Service (GPRS); Mobile Station (MS)—Base Station System (BSS) interface; Radio Link Control/Medium Access Control (RLC/MAC) protocol for Iu mode (3GPP TS 44.160 version 9.0.0 Release 9)," Technical Specificatiom, European Telecommunications Standards Institute (ETSI), Feb. 1, 2010, 120 pages.
Communication Pursuant to Article 94(3) EPC issued in EP Application No. 11703910.7 on May 4, 2015; 5 pages.
Office Action issued in Canadian Application No. 2,824,912 on Mar. 10, 2016; 5 pages.
Canadian Examiner's Report issued in related Canadian Application No. 2,824,912, dated Mar. 10, 2016.

\* cited by examiner

CELL CHANGE NOTIFICATION CONTROL FOR CSG CELLS

FIELD

The application relates to cell change notification for certain classes of cells, such as closed subscriber group cells.

SUMMARY

One broad aspect of the application provides a method in a mobile station, the method comprising: receiving a CCN active indication for at least one first RAT; dependent on at least in part that no CCN active indication has been received for a second RAT and dependent on at least in part that each received CCN active indication indicates CCN is active, sending a PCCN proposing reselection to a CSG cell of the second RAT; dependent on at least in part that no CCN active indication has been received for the second RAT and dependent on at least in part that any received CCN active indication indicates CCN is not active, attempting to reselect to a CSG cell of the second RAT without first sending a PCCN.

Another broad aspect of the application provides a method in a mobile station, the method comprising: receiving a CCN active indication for at least one first RAT; dependent on at least in part that no CCN active indication has been received for a second RAT and dependent on at least in part that each received CCN active indication indicates CCN is not active, attempting to reselect to a CSG cell of the second RAT without sending a PCCN.

Another broad aspect of the application provides method comprising: receiving a CCN active indication for at least one first RAT; dependent on at least in part that no CCN active indication has been received for a second RAT and dependent on at least in part that any received CCN active indication indicates CCN not active, attempting to reselect to a CSG cell of the second RAT without first sending a PCCN.

Another broad aspect of the application provides a method in a mobile station, the method comprising: dependent on at least in part that no CCN active indication has been received in respect of a RAT, refraining from attempting to reselect to a CSG cell of the RAT; dependent on at least in part that a CCN active indication has been received for the RAT: dependent on at least in part that the CCN active indication for the RAT indicates that CCN is active, sending a PCCN proposing reselection to a CSG cell of the RAT; dependent on at least in part that the CCN active indication for the RAT indicates that CCN is not active, attempting to reselect a CSG cell of the RAT without sending a PCCN.

Another broad aspect of the application provides a method in a mobile station, the method comprising: dependent on at least in part that no CCN active indication has been received in respect of a RAT, sending a PCCN proposing reselection to a CSG cell of the RAT.

Another broad aspect of the application provides a method comprising: receiving a CCN active indication for at least one first RAT; dependent on at least in part that no CCN active indication has been received for a second RAT and dependent on at least in part that any of received CCN active indication indicates CCN is active, sending a PCCN proposing reselection to a CSG cell of the second RAT.

Another broad aspect of the application provides a method comprising: receiving a CCN active indication for at least one first RAT; dependent on at least in part that no CCN active indication has been received for a second RAT and dependent on at least in part that any received CCN active indication indicates CCN is active and dependent on at least in part that information specific to the second RAT has also been received from a serving cell, sending a PCCN proposing reselection to a CSG cell of the second RAT; dependent on at least in part that no CCN active indication has been received for a second RAT and dependent on at least in part that any received CCN active indication indicates CCN is active and dependent on at least in part that information specific to the second RAT has also been received from a serving cell, sending a PCCN proposing reselection to a CSG cell of the second RAT; dependent on at least in part that no CCN active indication has been received for a second RAT and dependent on at least in part that each received CCN active indication indicates CCN is not active and dependent on at least in part that information specific to the second RAT has not been received from the serving cell, refraining from attempting reselection to a CSG cell of the second RAT without sending a PCCN.

Another broad aspect of the application provides a method comprising: receiving a CCN active indication for at least one first RAT; dependent on at least in part that no CCN active indication has been received for a second RAT and dependent on at least in part that information specific to the second RAT has also been received from a serving cell, sending a PCCN proposing reselection to a CSG cell of the second RAT.

Another broad aspect of the application provides a method comprising: receiving a CCN active indication for at least one first RAT; dependent on at least in part that no CCN active indication has been received for a second RAT and the received CCN active indication indicates CCN is active and information specific to the second RAT has not been received from serving cell, sending a PCCN proposing reselection to a CSG cell of the second RAT; dependent on at least in part that no CCN active indication has been received for a second RAT and the received CCN active indication indicates CCN is not active and information specific to the second RAT has not been received from serving cell, attempting to reselect to a CSG cell of the second RAT without first sending a PCCN; dependent on at least in part that no CCN active indication has been received for a second RAT and information specific to the second RAT has been received from serving cell, attempting to reselect to a CSG cell of the second RAT without first sending a PCCN.

Another broad aspect of the application provides a method comprising: receiving a CCN active indication for at least one first RAT; dependent on at least in part that no CCN active indication has been received for a second RAT and the received CCN active indication indicates CCN is not active and information specific to the second RAT has not been received from serving cell, attempting to reselect to a CSG cell of the second RAT without first sending a PCCN; dependent on at least in part that no CCN active indication has been received for a second RAT and information specific to the second RAT has been received from serving cell, attempting to reselect to a CSG cell of the second RAT without first sending a PCCN.

Another broad aspect of the application provides a method in a mobile station, the method comprising: the mobile station receiving a CCN active indication for each of at least one first RAT; dependent on at least in part that no CCN active indication has been received for a second RAT; based at least in part on one or more received CCN active indication, determining at least one of: a) whether reselection to a CSG cell of the second RAT is allowed, and b) if reselection to CSG cells is allowed, whether PCCN is required to be sent or not.

Another broad aspect of the application provides a mobile station comprising: at least one antenna; at least one wireless access radio component; a CSG cell reselector that controls the mobile station to implement a method comprising: receiving a CCN active indication for at least one first RAT; dependent on at least in part that no CCN active indication has been received for a second RAT and dependent on at least in part that each received CCN active indication indicates CCN is active, sending a PCCN proposing reselection to a CSG cell of the second RAT; dependent on at least in part that no CCN active indication has been received for the second RAT and dependent on at least in part that any received CCN active indication indicates CCN is not active, attempting to reselect to a CSG cell of the second RAT without first sending a PCCN.

Another broad aspect of the application provides a mobile station comprising: at least one antenna; at least one wireless access radio component; a CSG cell reselector that controls the mobile station to implement a method comprising: receiving a CCN active indication for at least one first RAT; dependent on at least in part that no CCN active indication has been received for a second RAT and dependent on at least in part that each received CCN active indication indicates CCN is not active, attempting to reselect to a CSG cell of the second RAT without sending a PCCN.

Another broad aspect of the application provides a mobile station comprising: at least one antenna; at least one wireless access radio component; a CSG cell reselector that controls the mobile station to implement a method comprising: receiving a CCN active indication for at least one first RAT; dependent on at least in part that no CCN active indication has been received for a second RAT and dependent on at least in part that any received CCN active indication indicates CCN not active, attempting to reselect to a CSG cell of the second RAT without first sending a PCCN.

Another broad aspect of the application provides a mobile station comprising: at least one antenna; at least one wireless access radio component; a CSG cell reselector that controls the mobile station to implement a method comprising: dependent on at least in part that no CCN active indication has been received in respect of a RAT, refraining from attempting to reselect to a CSG cell of the RAT; dependent on at least in part that a CCN active indication has been received for the RAT: dependent on at least in part that the CCN active indication for the RAT indicates that CCN is active, sending a PCCN proposing reselection to a CSG cell of the RAT; dependent on at least in part that the CCN active indication for the RAT indicates that CCN is not active, attempting to reselect a CSG cell of the RAT without sending a PCCN.

Another broad aspect of the application provides a mobile station comprising: at least one antenna; at least one wireless access radio component; a CSG cell reselector that controls the mobile station to implement a method comprising: dependent on at least in part that no CCN active indication has been received in respect of a RAT, sending a PCCN proposing reselection to a CSG cell of the RAT.

Another broad aspect of the application provides a mobile station comprising: at least one antenna; at least one wireless access radio component; a CSG cell reselector that controls the mobile station to implement a method comprising: receiving a CCN active indication for at least one first RAT; dependent on at least in park that no CCN active indication has been received for a second RAT and dependent on at least in part that any of received CCN active indication indicates CCN is active, sending a PCCN proposing reselection to a CSG cell of the second RAT.

Another broad aspect of the application provides a mobile station comprising: at least one antenna; at least one wireless access radio component; a CSG cell reselector that controls the mobile station to implement a method comprising: receiving a CCN active indication for at least one first RAT; dependent on at least in part that no CCN active indication has been received for a second RAT and dependent on at least in part that any received CCN active indication indicates CCN is active and dependent on at least in part that information specific to the second RAT has also been received from a serving cell, sending a PCCN proposing reselection to a CSG cell of the second RAT; dependent on at least in part that no CCN active indication has been received for a second RAT and dependent on at least in part that any received CCN active indication indicates CCN is active and dependent on at least in part that information specific to the second RAT has also been received from a serving cell, sending a PCCN proposing reselection to a CSG cell of the second RAT; dependent on at least in part that no CCN active indication has been received for a second RAT and dependent on at least in part that each received CCN active indication indicates CCN is not active and dependent on at least in part that information specific to the second RAT has not been received from the serving cell, refraining from attempting reselection to a CSG cell of the second RAT without sending a PCCN.

Another broad aspect of the application provides a mobile station comprising: at least one antenna; at least one wireless access radio component; a CSG cell reselector that controls the mobile station to implement a method comprising: receiving a CCN active indication for at least one first RAT; dependent on at least in part that no CCN active indication has been received for a second RAT and dependent on at least in part that information specific to the second RAT has also been received from a serving cell, sending a PCCN proposing reselection to a CSG cell of the second RAT.

Another broad aspect of the application provides a mobile station comprising: at least one antenna; at least one wireless access radio component; a CSG cell reselector that controls the mobile station to implement a method comprising: receiving a CCN active indication for at least one first RAT; dependent on at least in part that no CCN active indication has been received for a second RAT and the received CCN active indication indicates CCN is active and information specific to the second RAT has not been received from serving cell, sending a PCCN proposing reselection to a CSG cell of the second RAT; dependent on at least in part that no CCN active indication has been received for a second RAT and the received CCN active indication indicates CCN is not active and information specific to the second RAT has not been received from serving cell, attempting to reselect to a CSG cell of the second RAT without first sending a PCCN; dependent on at least in part that no CCN active indication has been received for a second RAT and information specific to the second RAT has been received from serving cell, attempting to reselect to a CSG cell of the second RAT without first sending a PCCN.

Another broad aspect of the application provides a mobile station comprising: at least one antenna; at least one wireless access radio component; a CSG cell reselector that controls the mobile station to implement a method comprising: receiving a CCN active indication for at least one first RAT; dependent on at least in part that no CCN active indication has been received for a second RAT and the received CCN active indication indicates CCN is not active and information specific to the second RAT has not been received from serving cell, attempting to reselect to a CSG cell of the second RAT without first sending a PCCN; dependent on at least in part that no CCN active indication has been received for a second RAT and information specific to the second RAT has been received from serving cell, attempting to reselect to a CSG cell of the second RAT without first sending a PCCN.

Another broad aspect of the application provides a mobile station comprising: at least one antenna; at least one wireless access radio component; a CSG cell reselector that controls the mobile station to implement a method comprising: the mobile station receiving a CCN active indication for each of at least one first RAT; dependent on at least in part that no CCN active indication has been received for a second RAT; based at least in part on one or more received CCN active indication, determining at least one of: a) whether reselection to a CSG cell of the second RAT is allowed, and b) if reselection to CSG cells is allowed, whether PCCN is required to be sent or not.

DETAILED DESCRIPTION

Figure 1:
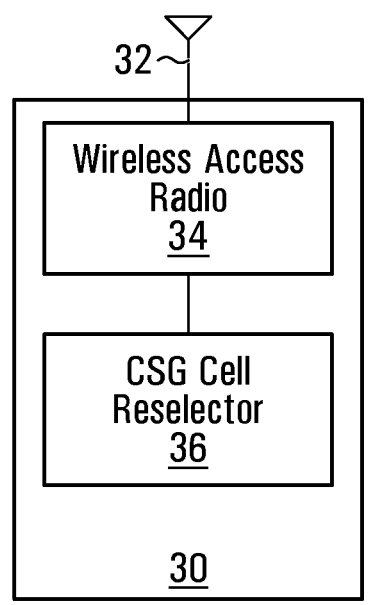
FIG. 1 is a block diagram of a mobile station.

There are three modes of network operation relating to mobility from a GERAN cell to another (not necessarily GERAN) cell: NC0, NC1, NC2. The commanded mode is indicated in broadcast signalling (NETWORK_CONTROL_ ORDER sent in SI2quater message, see 3GPP TS 44.018), but may also be signalled in point-to-point signalling. The commanded mode applies both in packet transfer mode and in packet idle mode. If a circuit-switched connection is active (e.g. in a voice call), different procedures apply (approximately similar to the rules for NC2, although handover is the only permitted means of cell change in this case).
NC0: In this mode, cell reselection is autonomous (i.e. is performed by the mobile without being prompted by the network). Criteria for reselection are specified and parameters relating to these criteria may be transmitted by the network.
NC2: In this mode, the mobile sends measurement reports to the network indicating the signal strength/quality of neighbouring cells; based on these reports, the network directs the mobile to perform cell reselection or handover. Autonomous reselection in this mode is not permitted.
NC1: This is a hybrid of NC0 and NC2; in this mode, the mobile station shall perform autonomous reselection if the appropriate criteria are met. However, the mobile also transmits measurement reports to the network, allowing the network to trigger reselection/handover as in NC2 mode.
Cell Change Notification Procedure The CCN (cell change notification) is a procedure that is applicable to a mobile station in NC0 or NC1 mode through which the mobile station informs the network of its candidate cell for reselection before completing the reselection.
Broadly speaking, the CCN procedure involves:
the mobile station selecting a candidate cell for reselection (which meets the various reselection criteria)
informing the network of its selection and starting a timer
waiting for a response from the network; pending such a response (or the expiry of the timer, no response having been received) not performing reselection
either acting in accordance with the response from the network or continuing with the reselection.

The network may indicate that the CCN procedure should be performed (in other words, CCN is "active") in respect of certain neighbour cells or types of neighbour cells. Typically this is done in broadcast system information, but may also be signalled via point-to-point signalling (e.g. in a Packet Measurement Order (PMO) message). Fields to indicate this include
  CCN_ACTIVE (sent in GPRS Cell Options, see 3GPP TS 44.060, applicable to GSM cells),
  CCN_SUPPORTED (sent in System Information (SI) type 2quater (SI2quater) see 3GPP TS 44.018, applicable to individual GSM target cells),
  3G_CCN_ACTIVE, E-UTRAN_CCN_ACTIVE (sent in SI2quater, applicable to 3G and E-UTRAN cells respectively; these indications apply on a per-RAT basis, i.e. to all target cells of that radio access technology).

CCN can be applicable only when the mobile is in packet transfer mode and in either NC0 or NC1 mode and when CCN_ACTIVE/3G_CCN_ACTIVE/E-UTRAN_CCN_ACTIVE (as applicable to the candidate cell) can be explicitly indicated as being active.

If, for the target cell for which reselection criteria are met, CCN is active, then the mobile station shall, before performing reselection, send a Packet Cell Change Notification (PCCN) message to the network identifying the selected target cell.

If transmitted, 3G_CCN_ACTIVE and E-UTRAN_CCN_ACTIVE apply to CSG cells of the corresponding RAT.
Response to a PCCN by the Network
  On receiving a PCCN, the network may:
  1. Do nothing: after timers elapse at the mobile station, the mobile will continue with reselection
  2. Order the mobile station to continue reselection to the selected cell, by sending a Packet Cell Change Continue (PCCC) message; a Packet Cell Change Order (PCCO) message (indicating the cell selected by the mobile station) may also be used in this case
  3. Order the mobile station to perform reselection to a different cell by sending a Packet Cell Change Order (PCCO) message
  4. Initiate a packet-switched handover (PS HO) procedure; this involves a preparation phase in which the target cell receives advance notification of the mobile's cell change, the target cell reserves resources and informs the mobile, via the serving cell, of these resources. This approach can reduce the service interruption time associated with cell change.

Before sending a PCCO or PCCC indicating a cell change to a GERAN cell, the network may send neighbour cell system information (i.e. generally, the minimum set of system information that the mobile would otherwise need to receive in the target cell before establishing packet transfer mode). Indeed, one of the benefits of the CCN procedure is to allow the mobile to receive this information before performing reselection (and hence avoid needing to receive it in the target cell, which may cause service interruption).

Before sending a packet-switched handover command where the target cell is a GSM cell, the network sends the minimum set of neighbour cell system information.

CSG Cells

For non-CSG cells, the mobile station (MS) may perform reselection if the candidate cell (or, in some cases, at least the frequency of the candidate cell) is explicitly listed in the received neighbour cell list, and/or reselection parameters applicable to that cell have been received or can otherwise be determined (e.g. by means of specified default values).

However, CSG (closed subscriber group) cells (which may, for example, be e.g. femto cells) are not fully under the control of the operator in the way other ("macro") cells are. CSG cells may be partially controlled by a home user, enterprise or institution that has installed the CSG cell on their premises. It is therefore desirable that deployment of a CSG cell in any location does not require any modification to the non-CSG cells in the area (otherwise an operator may have to modify the configuration of several non-CSG cells to accommodate the presence of a single CSG cell).

To this end, mobility by the MS towards CSG cells is autonomous and does not require that the CSG cell be listed in the neighbour cell list of the serving cell. Reselection parameters sent in system information and/or point-to-point signalling apply only to non-CSG cells, and there may be no CSG-specific reselection parameters which are transmitted by the network. This means that, when a CSG cell of a particular RAT (e.g. UTRAN) is deployed, it may not even be necessary for the non-CSG cells to be configured to support neighbour cells of the same RAT as the CSG cell.

Use of NC2 and CCN Mode

A network may wish to have the capability to restrict autonomous reselection (to any cell) of a mobile station, e.g. in case there is an ongoing data transfer. Even though the intended cell reselection may be to a RAT with better data rates, the user-perceived impact of such a change can be highly negative, since the flow of user data may be interrupted by the cell change, for example due to signalling procedures (such as routing area updates).

Ordering a mobile station into NC2 mode allows a network to restrict autonomous reselection, by making mobility fully network-controlled (measurement reports are sent, and mobility is ordered by the network by means of PS Handover or PACKET CELL CHANGE ORDER). However, data transfers (temporary block flows) start and stop frequently, so ordering mobiles into NC2 for each such transfer is impractical; on the other hand, monitoring reports from many mobile stations (both those with ongoing data transfers and those without) to ensure they are able to maintain service requires considerable processing effort by the network.

Another alternative is to use the CCN (cell change notification) procedure: as described above, the mobile station follows the process for autonomous reselection up until just before the point at which the mobile station performs reselection; it then notifies the network by means of a PACKET CELL CHANGE NOTIFICATION message of its intention to perform reselection, and identifies the target cell. The network may respond by preventing the reselection (by temporarily ordering the MS into NC2 mode), permitting the reselection, or ordering cell change to a different cell.

This latter approach allows the network to control all cell changes proposed by all mobile stations in packet transfer mode while only having to actively monitor those mobile stations for which autonomous reselection criteria towards a candidate cell have already been met; it avoids the network having to track (i.e. process measurement reports) and pro-actively trigger all necessary cell changes for all mobile stations in packet transfer mode or packet idle mode, which would be the case if it ordered all mobile stations into NC2 mode.

A mobile station that is in packet transfer mode, and is in NC0 or NC1 mode may perform autonomous reselection from a serving GERAN cell towards a 3G (UTRAN) or E-UTRAN CSG cell without first informing the network; the network cannot prevent this unless it transmits the 3G_CCN_ACTIVE or E-UTRAN_CCN_ACTIVE (respectively) flag (or orders the mobile station into NC2 mode as soon as it enters packet transfer mode, which is undesirable for the reasons described above). However, as described above, it is not required that the serving cell support 3G or E-UTRAN neighbour cells at all, and the serving cell may therefore not transmit such flag ("scenario 1").

Alternatively, the serving cell software may have been upgraded to allow for the possibility of 3G and/or E-UTRAN neighbour cells, but has not been configured to transmit 3G and/or E-UTRAN reselection parameters (including the relevant CCN_ACTIVE flags) for example, because there are no non-CSG 3G (respectively E-UTRAN) neighbour cells deployed and therefore no information relating to reselection criteria etc. for 3G (respectively E-UTRAN) cells needs to be transmitted ("scenario 2").

One aspect of the problem to be considered is that a network that is not broadcasting a CCN active indication for a particular RAT may or may not be able to process a PCCN message indicating a CSG cell of that RAT as the target cell—in scenario 1, the network may not support any signalling relating to 3G/E-UTRAN cells, including PCCN messages identifying 3G/E-UTRAN candidate cells; in scenario 2, the network may be configured to support such signalling.

As noted above, in some cases, networks will improve the (apparent) performance of the device+network for non-CSG cells by setting CCN active, and then ordering the MS into NC2 to prevent reselection during an ongoing data transfer. However, current specifications not only permit reselection to CSG cells without PCCN, but indicate that it should be performed if reselection criteria are met.

Various approaches are provided herein that allow the network to have some control over reselection to CSG cells without requiring the transmission of the corresponding CCN active indication (and hence, without requiring upgrade of the network software). In turn, they may be used to prevent the device from performing reselection.

Some of these solutions may also be used to reduce the risk of the network receiving a PCCN message indicating a target cell belonging to a RAT which the network entity does not recognize.

Some embodiments define the behaviour of the mobile station (i.e. whether autonomous reselection is permitted at all, and if so, whether a PCCN must be sent) in terms of information that is transmitted, such as CCN active indications corresponding to other RATs and other IEs specific to the RAT of the candidate cell but which do not include the CCN active indication for that RAT.

In some embodiments, a determination is made by the mobile station (rightly or wrongly) of whether or not a network which does not transmit a CCN active indication for a particular RAT would nevertheless be able to decode and respond, at least "reasonably", to a PCCN message indicating a candidate cell of that RAT. By "reasonably" here, it is meant that an appropriate response is generated (such as sending a PCCC message) which may not require the network to either recognize or be aware of the candidate cell.

In the following discussion, CCN active indications may, for example, be defined to include one or any combination of the following:
  a) those sent in broadcast messages;
  b) those received in a point-to-point messages;
  c) those contained in broadcast messages combined with those received in point-to-point messages in accordance with one or more rules for combining (for example, the currently specified rule in which point-to-point indication replaces a corresponding broadcast value).

In addition, in any of the embodiments described herein, a reference to receiving a CCN active indication for each of at least one first RAT may be defined to include receiving CCN indications of any RAT that are transmitted. For example, in determining the behaviour for reselection to a CSG cell of RAT-x, it may be that a transmitted CCN indication for any other RAT is considered.

Alternatively, in any of the embodiments described herein, a reference to receiving a CCN active for each of at least one first RAT may be defined to include one or more specific CCN active indications for a given context. For example, in determining the behaviour for reselection to a CSG cell of a particular RAT-x, it may be that only a transmitted CCN indication for a particular RAT-y is considered.

In general, the process of deciding whether reselection to a CSG cell of RAT-x is allowed or prohibited is based on the absence of received CCN Active indication for RAT-x and one or a combination of the following, where a reference to a RAT-y is a RAT other than the RAT-x of the CSG cell under consideration:

a) the receipt or non-receipt of a CCN-active indication for a first RAT-y;
b) the receipt or non-receipt of a CCN-active Indication for a second RAT-y;
. . .
c) the receipt or non-receipt of a CCN-active indication for an nth RAT-y;
d) if a CCN-active indication for a first RAT-y was received, whether it indicates CCN is active or not for the first RAT-y of interest;
e) if a CCN-active indication for a second RAT-y of interest was received, whether it indicates CCN is active or not for the second RAT-y of interest;
. . .
f) if a CCN-active indication for an nth RAT-y of interest was received, whether it indicates CCN is active or not for the nth RAT-y;
g) the receipt or non-receipt of RAT-x information from the serving cell.

The resulting behaviour can be summarized by a truth table that has input variables that are one or more of the variables listed above. Each row of the table lists a respective permutation of the one or more variables, and the outcome, namely whether or not reselection is allowed. It may be that the truth table can also be summarized by some more general rules.

The set of rules can be independently defined for each RAT-x, or may be common across one or more RAT-x's. There may be other criteria that must be satisfied before the mobile station performs a reselection. These may, for example, include reselection criteria such as signal strength and/or signal quality of the candidate cell, signal strength and/or quality of other cells operating at the same frequency, access restrictions applicable to the candidate cell (e.g. whether or not the closed subscriber group (CSG) ID of the candidate cell is within the "Allowed CSG list" of the MS).

In another embodiment, if reselection is allowed to a CSG cell of RAT-x, either as determined above, or through some other mechanism, whether or not a PCCN is required is determined based on one or more of:

a) the receipt or non-receipt of a CCN-active indication for a first RAT-y;
b) the receipt or non-receipt of a CCN-active Indication for a second RAT-y;
. . .
c) the receipt or non-receipt of a CCN-active indication for an nth RAT-y;
d) if a CCN-active indication for a first RAT-y of interest was received, whether it indicates CCN is active or not for the first RAT-y;
e) if a CCN-active indication for a second RAT-y of interest was received, whether it indicates CCN is active or not for the second RAT-y of interest;
. . .
f) if a CON-active indication for an nth RAT-y of interest was received, whether it indicates CCN is active or not for the nth RAT-y of interest;
g) the receipt or non-receipt of RAT-x information of interest from the serving cell.

The behaviour of the mobile station in terms of cell change notification is either "CCN active" (or "CCN enabled") in which case cell change notification is performed, or "CCN not active", in which case cell change notification is not performed. In the description of the embodiments that follow, references to a CCN active indication refer generally to an indication from a serving cell of whether CCN is active or not for a particular RAT. In the detailed examples provided below, a CCN active indication of '1' is used to indicate that CCN is active, and a CCN active indication of '0' is used to indicate that CCN is not active. More generally, this CCN active indication can come in any suitable format from the serving cell, or more generally, the network. When CCN is active, the mobile station is expected to send a notification of cell change (NCC) to the network before performing reselection. The embodiments below refer to the use of a PCCN for the purpose of performing cell change notification. More generally, anywhere a PCCN is referred to, the more general concept of an NCC can be applied; the NCC can be any message/communication that conveys to the network that the mobile station desires to make a cell change.

The resulting behaviour can be summarized by a truth table that has input variables that are one or more of the variables listed above. Each row of the table lists a respective permutation of the one or more variables, and the outcome, namely whether or not a PCCN is required. It may be that the truth table can also be summarized by some more general rules.

Referring now to FIG. 1, shown is a block diagram of a mobile station generally indicated at 30. The mobile station 30 has at least one antenna 32 and at least one wireless access radio component 34. The mobile station has a CSG cell reselector 36 that coordinates the performance by the mobile station of any one, or a combination, of the methods described herein. Of course, the mobile station 30 may have other components, not shown, for implementing the normal functionality of a mobile station.

Figure 2:
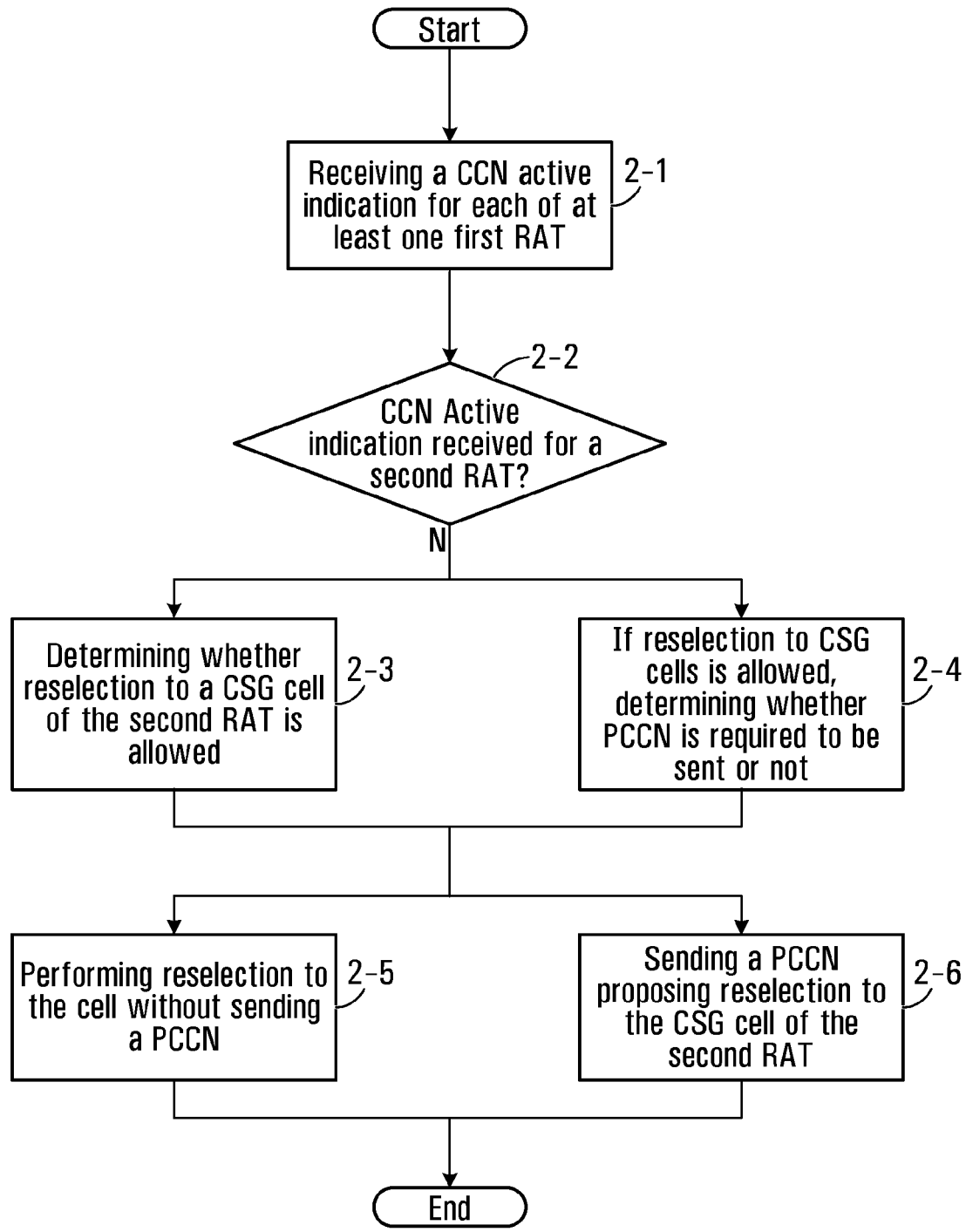
FIGS. 2 to 13 are flowcharts or logic diagrams of mobile station implemented methods.

Referring now to FIG. 2, shown is a flowchart of a method for execution by a mobile station, such as the mobile station of FIG. 1. The method begins at block 2-1 with the mobile station receiving a CCN active indication for each of at least one first RAT. Dependent on at least in part that no CCN active indication has been received for a second RAT (no path, block 2-2), then based at least in part on one or more received CCN active indication, the mobile station performs at least one of a) determining whether reselection to a CSG cell of the second RAT is allowed (block 2-3) and b) if reselection to CSG cells is allowed, determining whether PCCN is required to be sent or not (block 2-4).

In some embodiments, the method further includes block 2-5. Dependent on at least in part that reselection criteria for a CSG cell of the second RAT are satisfied, and it was determined that reselection to a CSG cell of the second RAT is allowed without sending a PCCN, performing reselection to the cell without sending a PCCN.

In some embodiments, the method further includes block 2-6. Dependent on at least in part that reselection criteria for a CSG cell of the second RAT are satisfied, and it was determined that reselection to a CSG cell of the second RAT is allowed with a requirement to send a PCCN, sending a PCCN proposing reselection to the CSG cell of the second RAT.

Figure 3:
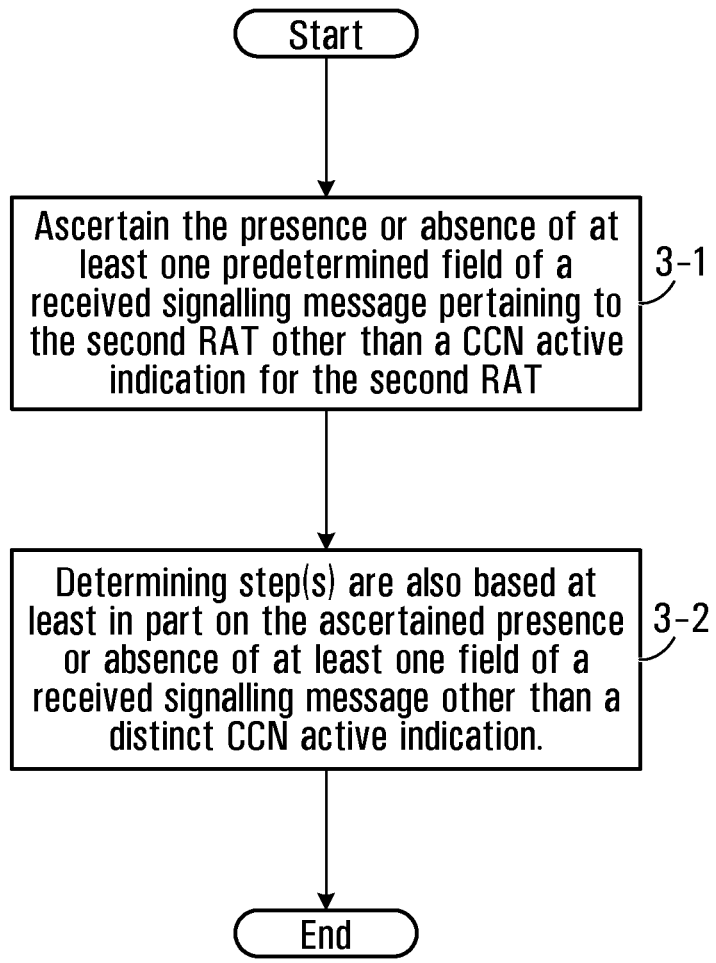

In some embodiments, the additional steps of FIG. 3 are performed. Examples 7 and 8 described below are specific examples of this approach. In block 3-1, the mobile station ascertains the presence or absence of at least one field of a received signalling message pertaining to the second RAT other than a distinct CCN active indication for the second RAT. The at least one field of a received signalling message pertaining to the second RAT other than a distinct CCN active indication for the second RAT may be predetermined. In block 3-2, one or more of the determining step(s) of FIG. 2 are also based at least in part on the ascertained presence or absence of at least one field of a received signalling message pertaining to the RAT other than a CCN active indication.

In some cases, the at least one field comprises at least one IE specific to the second RAT of the candidate cell but does not include the distinct CCN active indication for that RAT.

In a specific example, if each received CCN active indication indicates CCN is not active, the performance of cell reselection to a CSG cell of the second RAT is prohibited. If any of received CCN active indication indicates CCN is active:

a) the mobile station determines that cell reselection to a CSG cell of the second RAT is allowed; and b) the mobile station ascertains the presence or absence of at least one field of a received signalling message pertaining to the second RAT other than a CCN active indication;

c) the mobile station selects between transmitting a PCCN and not transmitting a PCCN based on the ascertained presence or absence of the at least one field of the received signalling message pertaining to the second RAT other than a CCN active indication.

In some embodiments, it is possible to indicate CCN active on a per-cell basis for 2G cells. If this option is used such that CCN applies to some GSM cells but not others, then it is presumed that this might be for reasons specific to the target cell (e.g. some form of access control), rather than to optimize performance in the serving cell; another reason may be related to the support of PS Handover towards certain cells (the CCN procedure may be used to trigger PS Handover towards those cells that support it). Such scenarios may, for example, be considered as CCN_ACTIVE=0 for 2G in the examples below (i.e. autonomous reselection towards 2G cells without PCCN is not prevented in principle).

EXAMPLES

Specific generic example embodiments are provided below; they are generic in the sense that they are not specific to a particular RAT. In some cases, the generic example is then followed by a RAT-specific example, in most cases E-UTRAN specific; however, these are equally applicable to UTRAN CSG cells (in which case, E-UTRAN would be an 'other RAT') or some other RAT. It is noted that the rules may be different for different types of CSG cells, e.g. UTRAN CSG cells vs. E-UTRAN CSG cells. For example, one of the embodiments described below may be implemented for UTRAN CSG cells, and another for E-UTRAN CSG cells.

Rules restricting autonomous reselection may also extend to limit manual CSG selection (i.e. where the user requests a change of serving cell to a CSG cell). Due to the uncoordinated nature of CSG deployment (specifically, that they are not identified in neighbour cell lists), mobile-triggered reselections may suffer from the trade-off between high battery consumption (frequent attempts to detect) and high latency (infrequent attempts to detect CSG cells). To overcome this, a manual (e.g. user-triggered) option may be provided e.g. so that a user, arriving home and knowing that he has a CSG cell located at his home, may trigger manual reselection without waiting for the MS to do so autonomously. Allowing a manual reselection may incur the same limitations as discussed above, such as interrupted data flow, etc.

In some embodiments, the restrictions described herein relating to MS autonomous reselection may also apply to a manual reselection process, such that, for example, the MS may be prohibited from completing a manually-requested reselection during packet transfer mode, or for example, that a manually-requested reselection must trigger the transmission of a PCCN.

Example 1

In a first example, if a CCN active indication has not been sent in respect of a RAT of a CSG cell, then the mobile station is prohibited from performing autonomous reselection to the CSG cell (or any CSG cell of that RAT) if any of the CCN active indications which are transmitted are set to '1'. If all of the transmitted CCN active indications are set to '0', then autonomous reselection (without sending PCCN) is permitted.

Example 1 is summarized in the table below. The first line of the table indicates that if the network has imposed any restriction on reselecting to another cell (such as requirements to send a PCCN), but has not sent a CCN active indication in respect of the RAT of a CSG cell, the mobile station is not allowed to reselect the CSG cell.

The second line of the table indicates that if all of the transmitted CCN active indications are set to '0', the network is not expecting PCCN for other RATs, so the MS concludes that the network would not be interested in receiving PCCN for CGS cells of the RAT for which no CCN active indication has been sent, and the mobile station is permitted to go ahead with the reselection without sending a PCCN.

If the network "transmitted" CCN active indication in respect of the RAT of the CSG cell, then the mobile station applies the transmitted CCN active indication to reselection to a CSG cell of that RAT. If it was transmitted and "yes", the MS can perform reselection, but must first send a PCCN. If it was transmitted and "no", the MS is permitted to perform the reselection and does not send a PCCN.

Example 1

General

| Transmitted CCN active indication(s) (other RATs) | CCN active for RAT of a CSG cell sent? | Reselection to the CSG permitted? | PCCN to be sent prior to reselection? |
|---|---|---|---|
| Any set to '1' | Not sent | No | n/a |
| all set to '0' | Not sent | Yes | No |

Figure 4:
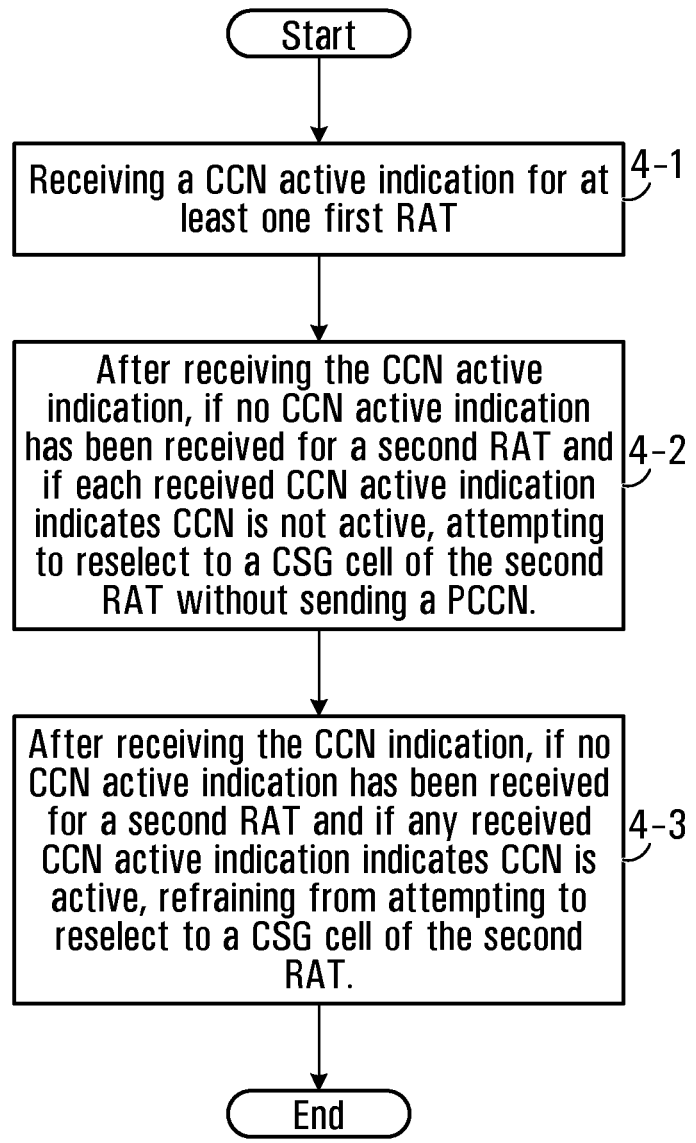

FIG. 4 is a flowchart of a method in a mobile station provided by an embodiment of the application that is based on Example 1. The method begins in block 4-1 with receiving a CCN active indication for at least one first RAT. In block 4-2, dependent on at least in part that no CCN active indication has been received for a second RAT and dependent on at least in part that each received CCN active indication indicates CCN is not active, attempting to reselect to a CSG cell of the second RAT without sending a PCCN. FIGS. 4 to 12 differ slightly from the description in that they depict logical "if" conditions, rather than "dependent on at least in part that" conditions. The logical "if" condition can be considered a specific example of the "dependent on at least in part that" condition.

In some embodiments block 4-3 is also included. This involves after receiving the CCN indication, dependent on at least in part that no CCN active indication has been received for a second RAT, and dependent on at least in part that any received CCN active indication indicates CCN is active, refraining from attempting to reselect to a CSG cell of the second RAT.

The following table is a specific example of example 1 specific to E-UTRAN: If E-UTRAN_CCN_ACTIVE is not sent, then the mobile station is prohibited from performing autonomous reselection to an E-UTRAN CSG cell if any of the CCN active indications which are transmitted are set to '1'. If all of the transmitted CCN active indications are set to 0, then autonomous reselection (without sending PCCN) is permitted.

Example 1

E_UTRAN

| Transmitted CCN active indications (other RATs) | E-UTRAN_CCN_active | Reselection to E-UTRAN CSG cell permitted? | PCCN to be sent prior to reselection? |
|---|---|---|---|
| any set to '1' | Not sent | No | n/a |
| all set to '0' | Not sent | Yes | No |
| [don't care] | transmitted | As per current rules (see note below) | |

Note:
Where behaviour is specified as being 'as per current rules', this is a non-limiting example of the behaviour in the indicated set of conditions.

Example 2

In another example, if a CCN active indication has not been sent in respect of a RAT of a CSG cell, the mobile station is prohibited from performing autonomous reselection to any CSG cell of the RAT if all CCN active indications which are transmitted are set to '1'. This is similar to the first example, but differs in that, in the previous example, only one CCN active indication has to be set to '1' for the mobile station to be prohibited from performing autonomous reselection to CSG cells of a RAT for which no CCN active indication has been received.

Example 2

General

| Transmitted CCN active indications (other RATs) | CCN active for RAT of a CSG cell sent? | Reselection to the CSG permitted? | PCCN to be sent prior to reselection? |
|---|---|---|---|
| all set to '1' | not sent | No | n/a |
| any set to '0' | not sent | Yes | No |

Figure 5A:
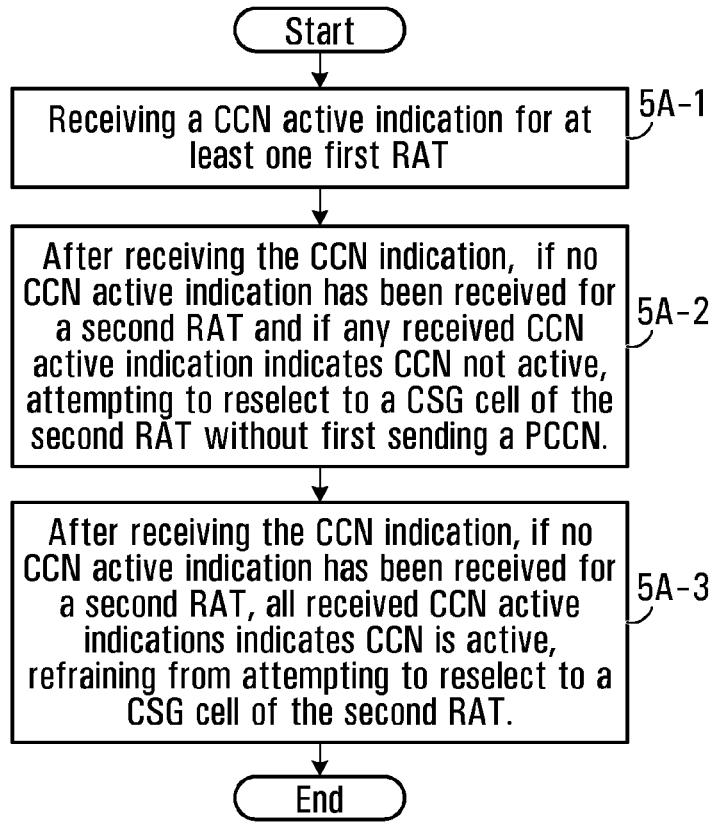

FIG. 5A is a flowchart of a method in a mobile station provided by an embodiment of the application that is based on Example 2. The method begins in block 5A-1 with receiving a CCN active indication for at least one first RAT. In block 5A-2, dependent on at least in part that no CCN active indication has been received for a second RAT and dependent on at least in part that any received CCN active indication indicates CCN not active, attempting to reselect to a CSG cell of the second RAT without first sending a PCCN.

In some embodiments, the method further included block 5A-3 which involves dependent on at least in part that no CCN active indication has been received for a second RAT, all received CCN active indications indicates CCN is active, refraining from attempting to reselect to a CSG cell of the second RAT.

Figure 5B:
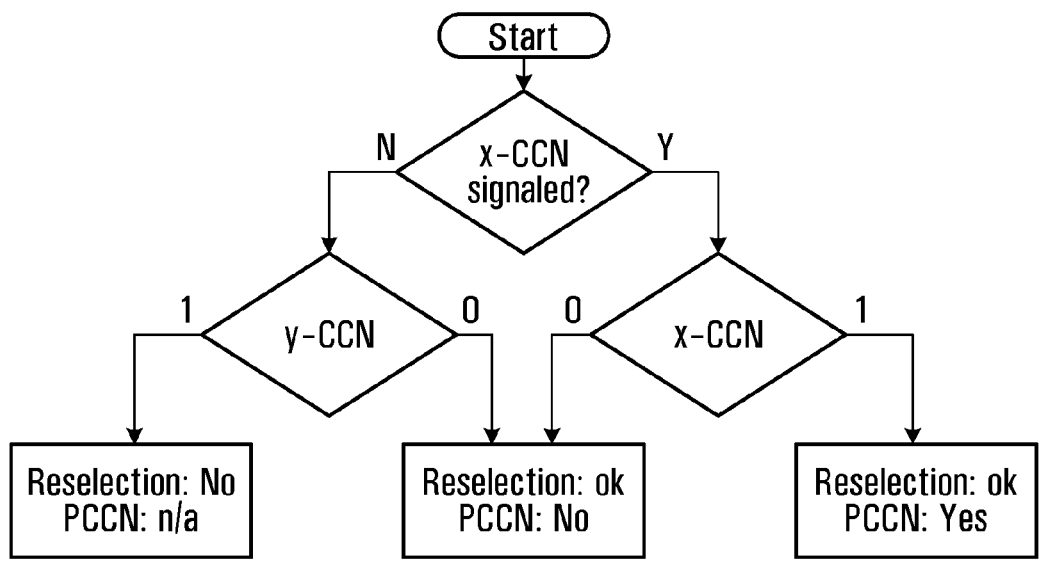

FIG. 5B is a logic flow that includes both the new behaviour of Example 2 the behaviour defined by current rules in respect of how the mobile station should operate if a CCN was received for the RAT of a CSG cell. In FIG. 5B, it is assumed that the RAT of the CSG cell is RAT-x, and that RAT-y is some other RAT. x-CCN is a CCN for RAT-x, while y-CCN is a CCN for RAT-y.

The following table is specific example of example 2 specific to E-UTRAN: The mobile station is prohibited from performing autonomous reselection to any E-UTRAN CSG cell if all CCN active indications which are transmitted are set to '1'.

Example 2

E_UTRAN Specific

| Transmitted CCN active indications (other RATs) | CCN active for RAT of a CSG cell sent? | Reselection to the CSG permitted? | PCCN to be sent prior to reselection? |
|---|---|---|---|
| all set to '1' | not sent | No | n/a |
| any set to '0' | not sent | Yes | No |
| [don't care] | transmitted | as per current rules | |

Example 3

In another example, if a CCN active indication has not been sent in respect of a RAT of a CSG cell, but another CCN active indication has been sent, the mobile station is allowed to perform reselection to any CSG cell of the RAT. If all CCN active indications which are transmitted are set to '1' the mobile station must first send a PCCN, whereas, if any are set to '0', the mobile station does not first send a PCCN.

| Transmitted CCN active indications (other RATs) | CCN active for RAT of a CSG cell sent? | Reselection to the CSG permitted? | PCCN to be sent prior to reselection? |
|---|---|---|---|
| all set to '1' | not sent | Yes | Yes |
| any set to '0' | not sent | Yes | No |

Figure 6A:
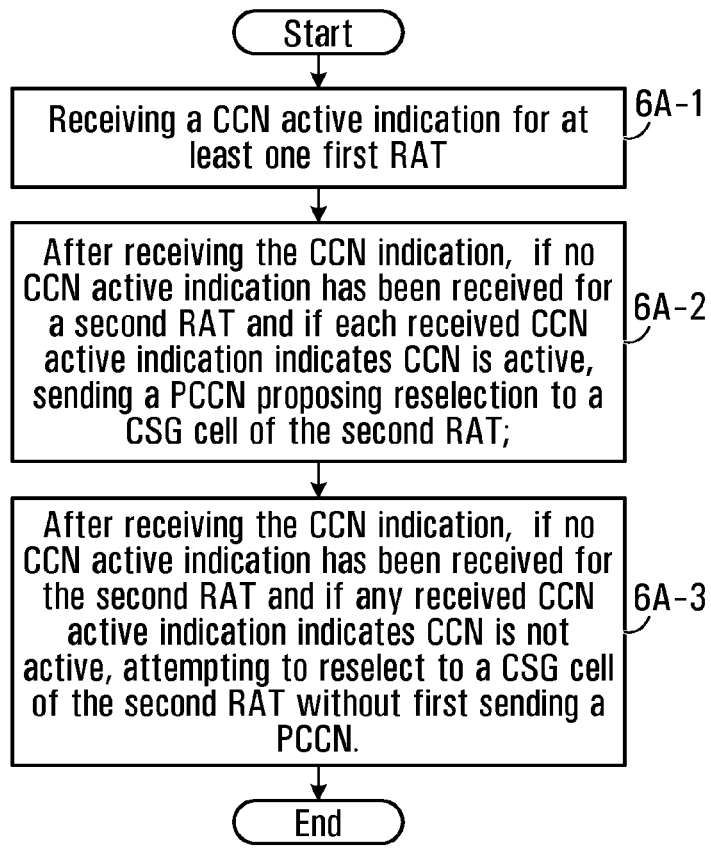

FIG. 6A is a flowchart of a method in a mobile station provided by an embodiment of the application that is based on Example 3. The method begins in block 6A-1 with receiving a CCN active indication for at least one first RAT. In block 6A-2, dependent on at least in part that no CCN active indication has been received for a second RAT and dependent on at least in part that each received CCN active indication indicates CCN is active, sending a PCCN proposing reselection to a CSG cell of the second RAT. In block 6A-3, dependent on at least in part that no CCN active indication has been received for the second RAT and dependent on at least in part that any received CCN active indication indicates CCN is not active, attempting to reselect to a CSG cell of the second RAT without first sending a PCCN.

Figure 6B:
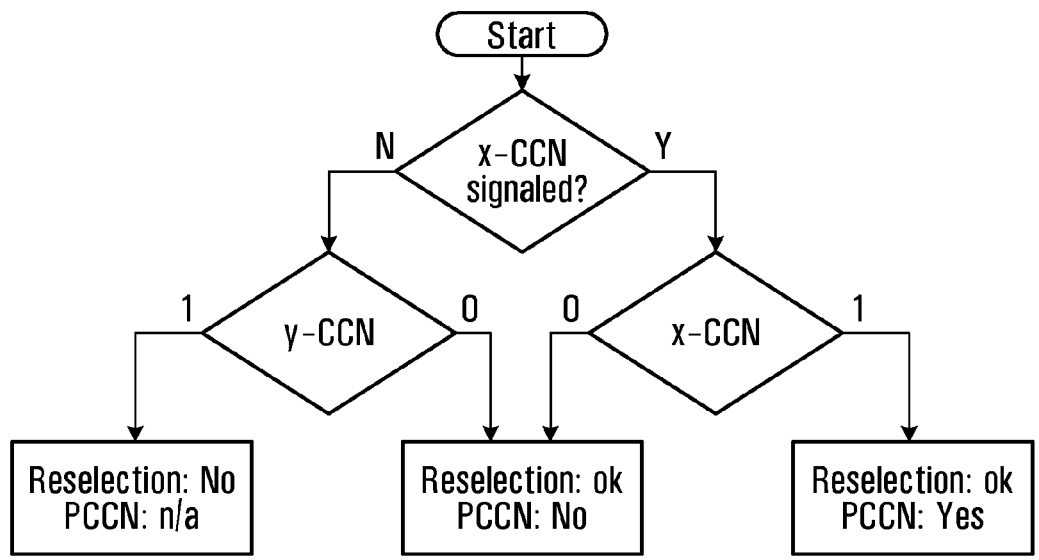

FIG. 6B is a logic flow that includes both the new behaviour of Example 3 the behaviour defined by current rules in respect of how the mobile station should operate if a CCN was received for the RAT of a CSG cell. In FIG. 6B, it is assumed that the RAT of the CSG cell is RAT-x, and that RAT-y is some other RAT. x-CCN is a CCN for RAT-x, while y-CCN is a CCN for RAT-y.

Example 4

In another example, the mobile station is prohibited from performing autonomous reselection to any CSG cell of a RAT for which no CCN active indication has been received. This simply is saying that if no CCN active indication for that RAT of a CSG cell is received, the mobile station cannot perform autonomous reselection to that cell.

Example 4

General

| Transmitted CCN active indications (other RATs) | CCN active for RAT of a CSG cell sent? | Reselection to the CSG permitted? | PCCN to be sent prior to reselection? |
|---|---|---|---|
| [don't care] | not sent | No | n/a |

Figure 7:
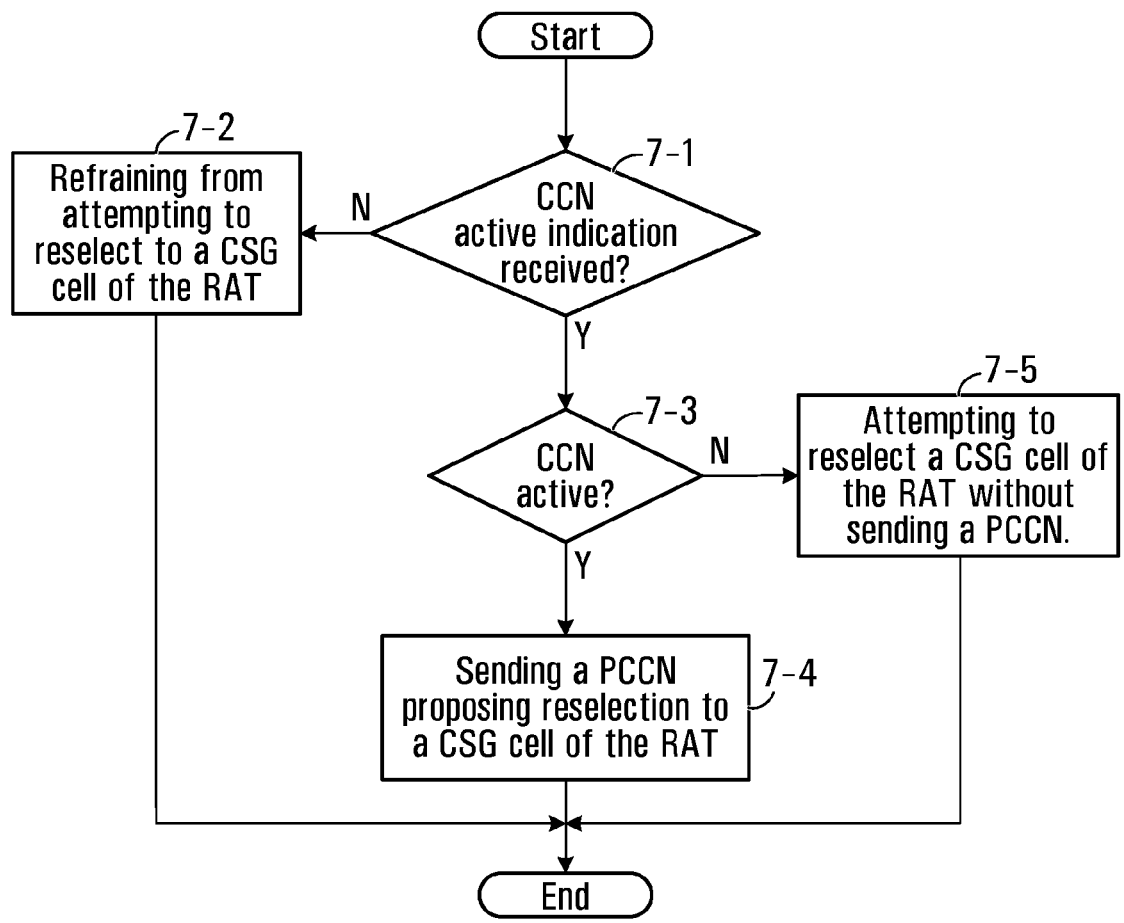

FIG. 7 is a flowchart of a method in a mobile station provided by an embodiment of the application that is based on Example 4. dependent on at least in part that no CCN active indication has been received in respect of a RAT (no path, block 7-1), the mobile station refrains from attempting to reselect to a CSG cell of the RAT; in block 7-2. Otherwise, a CCN active indication has been received for the RAT (yes path block 7-1). dependent on at least in part that the CCN active indication for the RAT indicates that CCN is active (yes path block 7-3), the mobile station sends a PCCN proposing reselection to a CSG cell of the RAT at block 7-4. dependent on at least in part that the CCN active indication for the RAT indicates that CCN is not active (no path block 7-3), the mobile station attempts to reselect a CSG cell of the RAT without sending a PCCN at block 7-5.

Example 4

E_UTRAN Specific

The mobile station is prohibited from performing autonomous reselection to a E-UTRAN CSG cell unless E-UTRAN_CCN_ACTIVE is provided in the serving cell.

| Transmitted CCN active indications (other RATs) | E-UTRAN_CCN_ACTIVE | Reselection to CSG cell permitted? | PCCN to be sent prior to reselection? |
|---|---|---|---|
| [don't care] | not sent | No | n/a |
| [don't care] | Transmitted | | As per current rules |

Example 5

In another example, if a CCN active indication has not been sent in respect of a RAT of a CSG cell, the mobile station shall behave as if a CCN active="yes" indication had been received, i.e. reselection is allowed and PCCN shall be sent.

Example 5

General

| Transmitted CCN active indications (other RATs) | CCN active for RAT of a CSG cell sent? | Reselection to the CSG permitted? | PCCN to be sent prior to reselection? |
|---|---|---|---|
| [don't care] | not sent | Yes | yes (note) |

Note:
in this case, the network may receive a PCCN which it can recognize as being a PCCN but cannot decode some or all of the contents. However, it may nonetheless be able to respond by sending PMO (NC2) or PCCC.

Figure 8:
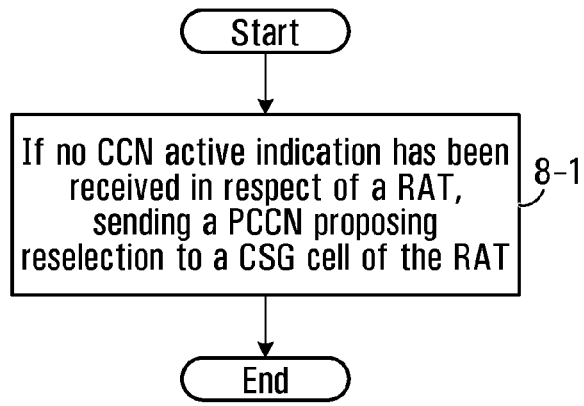

FIG. 8 is a flowchart of a method in a mobile station provided by an embodiment of the application that is based on Example 5. The method involves, at block 8-1, dependent on at least in part that no CCN active indication has been received in respect of a RAT, sending a PCCN proposing reselection to a CSG cell of the RAT.

Example 5

E_UTRAN Specific

| Transmitted CCN active indications (other RATs) | E-UTRAN_CCN_ACTIVE | Reselection to CSG cell permitted? | PCCN to be sent prior to reselection? |
|---|---|---|---|
| [don't care] | not sent | Yes | yes (note) |
| [don't care] | Transmitted | As per current rules | |

Note:
in this case, the network may receive a PCCN which it can recognize as being a PCCN but cannot decode some or all of the contents. However, it may nonetheless be able to respond by sending PMO (NC2) or PCCC.

Example 6

In another example, if a CCN active indication has not been sent in respect of a RAT of a CSG cell, the mobile station behaves as if a CCN active indication was sent and set to "yes", if at least one CCN active indication was transmitted and set to '1'. On the other hand, if all received CCN active indications are set to '0', then the mobile station is prohibited from reselecting to a CSG cell of that RAT.

| Transmitted CCN active indications (other RATs) | E-UTRAN_CCN_ACTIVE | Reselection to CSG cell permitted? | PCCN to be sent prior to reselection? |
|---|---|---|---|
| Any set to '1' | not sent | Yes | yes (note) |
| All set to '0' | not sent | No | n/a |

Note:
in this case, the network may receive a PCCN which it can recognize as being a PCCN but cannot decode some or all of the contents. However, it may nonetheless be able to respond by sending PMO (NC2) or PCCC.

Figure 9:
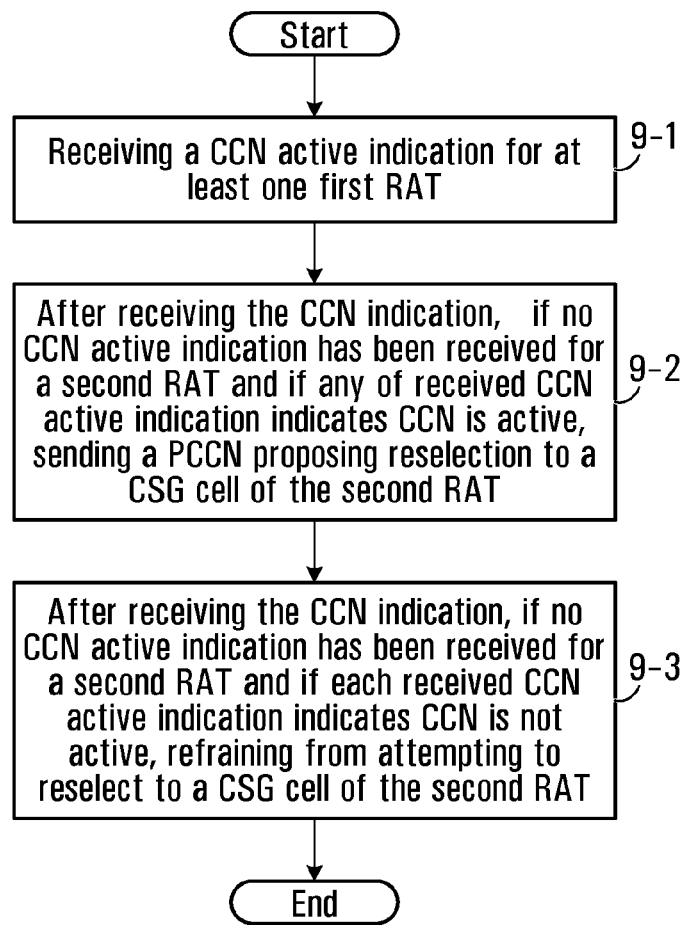

FIG. 9 is a flowchart of a method in a mobile station provided by an embodiment of the application that is based on Example 6. The method begins in block 9-1 with receiving a CCN active indication for at least one first RAT. In block 9-2, dependent on at least in part that no CCN active indication has been received for a second RAT and dependent on at least in part that any of received CCN active indication indicates CCN is active, sending a PCCN proposing reselection to a CSG cell of the second RAT.

In some embodiments, the method further includes block 9-3 which involves dependent on at least in part that no CCN active indication has been received for a second RAT and dependent on at least in part that each received CCN active indication indicates CCN is not active, refraining from attempting to reselect to a CSG cell of the second RAT.

Example 6

E-UTRAN Specific

If E-UTRAN_CCN_ACTIVE is not sent, the mobile station shall consider E-UTRAN_CCN_ACTIVE=1 if any CCN active indications which are transmitted is set to '1'. If all transmitted CCN active indications are set to '0', then the mobile station is prohibited from reselecting to a E-UTRAN CSG cell.

| Transmitted CCN active indications (other RATs) | E-UTRAN_CCN_ACTIVE | Reselection to CSG cell permitted? | PCCN to be sent prior to reselection? |
|---|---|---|---|
| any set to '1' | not sent | Yes | yes (note) |
| All set to '0' | not sent | No | n/a |
| [don't care] | transmitted | as per current rules | |

Note:
in this case, the network may receive a PCCN which it can recognize as being a PCCN but cannot decode some or all of the contents. However, it may nonetheless be able to respond by sending PMO (NC2) or PCCC.

Example 7

In another example, other contents of messages to determine whether the network supports E_UTRAN signalling, especially PCCN. Normally, a E-UTRAN CCN active indication is bundled with other E-UTRAN-specific signalling information such as a macro neighbour cell list, however, certain types of E-UTRAN-specific signalling can be transmitted independently of the E-UTRAN CCN active indication and neighbour cell list. For example, some newer networks may be configured to send the E_UTRAN CSG description, but not to transmit the E_UTRAN CCN active indication or neighbour cell list. In accordance with an embodiment of the application, the mobile station is configured to look for certain E_UTRAN-specific signalling. If it is received, than the mobile station is configured to transmit PCCN in respect of E_UTRAN CSG cells. In some embodiments, this may also determine whether or not reselection to such CSG cells is permitted (e.g. if PCCN is required for any reselection, then the possibility of performing reselection is predicated on the possibility to send a PCCN).

More generally, in some embodiments, the mobile station looks for the presence or absence of IEs specific to the RAT of the candidate cell but which do not include the CCN active indication for that RAT.

A specific first example is an extension of Example 6 described above. Under this circumstance, E_UTRAN CSG description is sent, and if at least one other transmitted indication is set to "1", the mobile station is required to send a PCCN. On the other hand, if E_UTRAN CSG description is sent and no other transmitted indication is set to '1', then the mobile station is allowed to perform reselection to E_UTRAN CSG cells without sending a PCCN.

This approach to estimate (make an educated guess) whether the network is configured to decode a PCCN identifying a CSG cell of a particular RAT in order to determine whether to send a PCCN may be applied in conjunction with other solutions described herein, e.g. previous solutions which specify that a PCCN shall be sent may be modified to restrict the sending of a PCCN to those cases where the MS has estimated (by receiving signalling relating to the corresponding RAT) that the network can decode a PCCN identifying the candidate cell.

in part that information specific to the second RAT has also been received from a serving cell, the mobile station sends a PCCN proposing reselection to a CSG cell of the second RAT. In block 10-3, dependent on at least in part that no CCN active indication has been received for a second RAT and dependent on at least in part that any received CCN active indication indicates CCN is active and dependent on at least in part that information specific to the second RAT has also been received from a serving cell, the mobile station sends a PCCN proposing reselection to a CSG cell of the second RAT.

In some embodiments the method also includes block 10-4 which involves dependent on at least in part that no CCN active indication has been received for a second RAT and dependent on at least in part that each received CCN active indication indicates CCN is not active and dependent on at least in part that information specific to the second RAT has not been received from the serving cell, the mobile station refrains from attempting reselection to a CSG cell of the second RAT without sending a PCCN.

Figure 11:
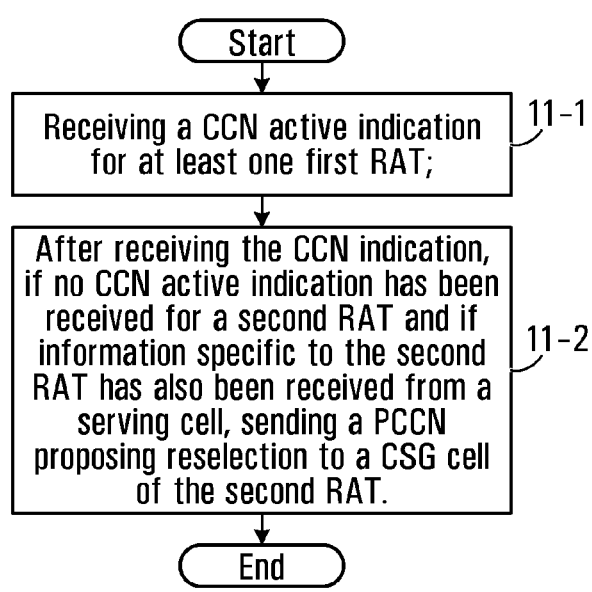

In another embodiment, so long as information specific to the second RAT has been received from a serving cell, and no CCN active indication has been received for the second RAT, the mobile stations is allowed to perform reselection subject to transmission of a PCCN. Other reselection criteria may also be applied as in any of the embodiments described herein. FIG. 11 is a flowchart of a method in a mobile station provided by an embodiment of the application. The method begins in block 11-1 with receiving a CCN active indication for at least one first RAT. In block 11-2, dependent on at least in part that no CCN active indication has been received for a second RAT and dependent on at least in part that information specific to the second RAT has also been received from a serving cell, sending a PCCN proposing reselection to a CSG cell of the second RAT.

| Transmitted CCN active indications (other RATs) | E-UTRAN_CCN_ACTIVE | E-UTRAN CSG description | Reselection to CSG cell permitted? | PCCN to be sent prior to reselection? |
|---|---|---|---|---|
| any set to '1' | not sent | Sent | Yes | Yes (note) |
| any set to '1' | not sent | not sent | Yes | No |
| All set to '0' | not sent | [don't care] | No | n/a |
| [don't care] | Transmitted | [don't care] | as per current rules | |

Note:
It is unlikely that in this case, the network cannot decode completely the PCCN since it has been upgraded at least to support sending of E-UTRAN CSG description.

Figure 10:
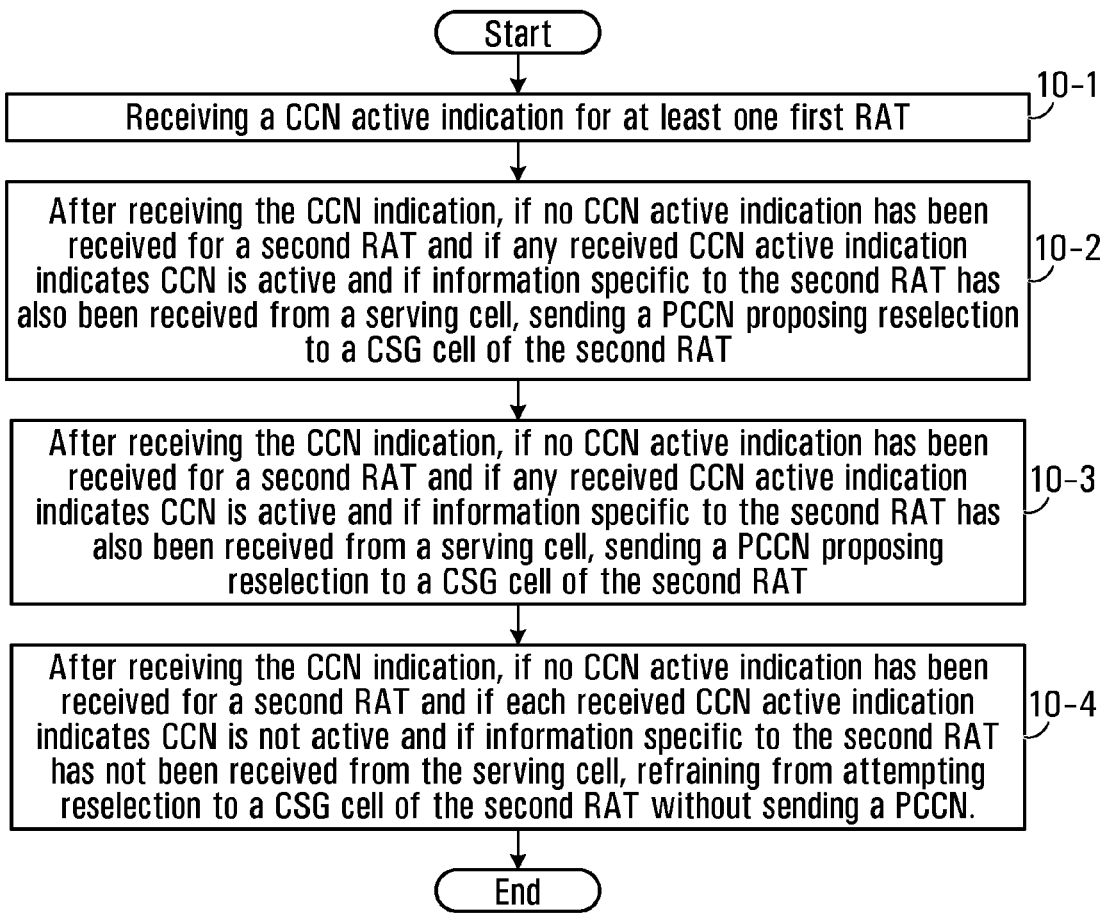

FIG. 10 is a flowchart of a method in a mobile station provided by an embodiment of the application that is based on Example 7. The method begins in block 10-1 with receiving a CCN active indication for at least one first RAT. In block 10-2, dependent on at least in part that no CCN active indication has been received for a second RAT and dependent on at least in part that any received CCN active indication indicates CCN is active and dependent on at least Example 8

In another example, noting that the combination of absence of 3G_CCN_ACTIVE indication and presence of 3G neighbour cell list/reselection parameters may likely indicate lack of support for PCCN signalling with a 3G candidate cell, this combination is taken into account for 3G in the following table:

| Transmitted CCN_ACTIVE indications | 3G Neighbour ceil list/ reselection parameters | 3G_CCN_ACTIVE | Reselection to 3G CSG cell permitted? | PCCN to be sent prior to reselection? | Comments |
|---|---|---|---|---|---|
| [don't care] | [don't care] | Sent | as per current rules | | The case where the corresponding |

-continued

| Transmitted CCN_ACTIVE indications | 3G Neighbour cell list/reselection parameters | 3G_CCN_ACTIVE | Reselection to 3G CSG cell permitted? | PCCN to be sent prior to reselection? | Comments |
|---|---|---|---|---|---|
| | | | | | CCN_ACTIVE indication is sent is not in the scope of this paper |
| set to '1' | not sent | not sent | Sub-Example 1: yes | Sub-Example 1: Yes | These rows correspond (likely) to |
| set to '1' | not sent | not sent | Sub-Example 2: no | Sub-Example 2: n/a | 2G cells that have never been |
| set to '0' | not sent | not sent | Yes | No | configured to indicate any signalling relating to 3G cells. The absence of 3G_CCN_ACTIVE is therefore not considered to be an explicit indication of the lack of requirement/support for PCCN for a 3G cell. Therefore, the 2G_CCN_ACTIVE is considered to apply also to 3G CSG cells. The example 1 and example 2 behaviour definitions are alternatives (only one would apply): example 1 assumes that sending a PCCN for a 3G cell is okay, even though there is a risk that the network might not be able to decode it; example 2 is more conservative and simply prevents reselection at all to 3G cells. |
| [don't care] | Transmitted | not sent | Yes | No | These rows correspond (likely) to 2G cells that have been configured to indicate 3G cells but do not indicate 3G_CCN_ACTIVE. This is taken to mean that the omission of 3G_CCN_ACTIVE is intentional, i.e. PCCN for 3G cells is either not required or not supported. |

Figure 12A:
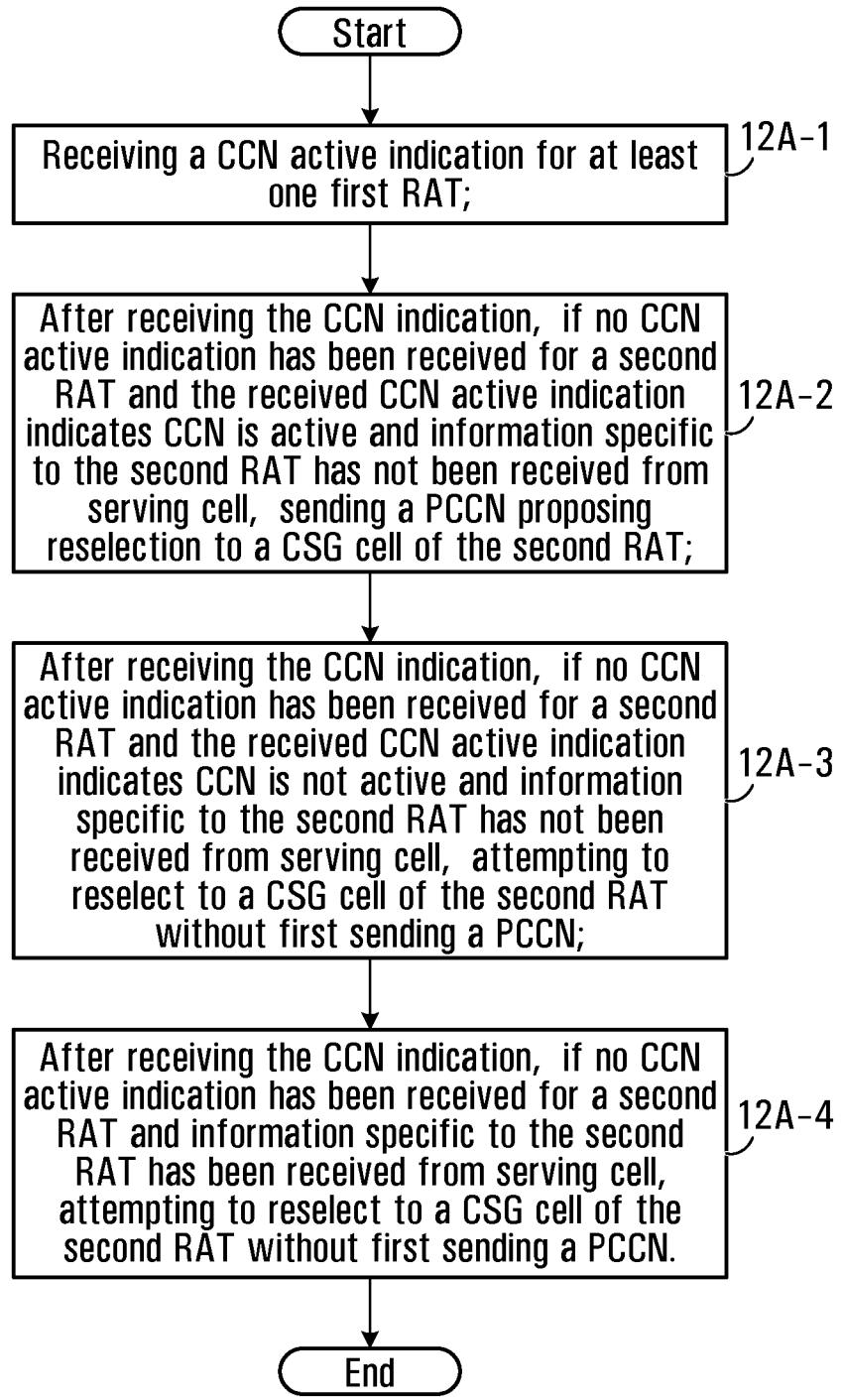

FIG. 12A is a flowchart of a method in a mobile station provided by an embodiment of the application that is based on Example 8, sub-example 1. The method begins in block 12A-1 with receiving a CCN active indication for at least one first RAT. In block 12A-2, dependent on at least in part that no CCN active indication has been received for a second RAT and the received CCN active indication indicates CCN is active and dependent on at least in part that information specific to the second RAT has not been received from serving cell, the mobile station sends a PCCN proposing reselection to a CSG cell of the second RAT. In block 12A-3, dependent on at least in part that no CCN active indication has been received for a second RAT and the received CCN active indication indicates CCN is not active and dependent on at least in part that information specific to the second RAT has not been received from serving cell, the mobile station attempts to reselect to a CSG cell of the second RAT without first sending a PCCN. In block 12A-4, dependent on at least in part that no CCN active indication has been received for a second RAT and information specific to the second RAT has been received from serving cell, attempting to reselect to a CSG cell of the second RAT without first sending a PCCN.

Figure 12B:
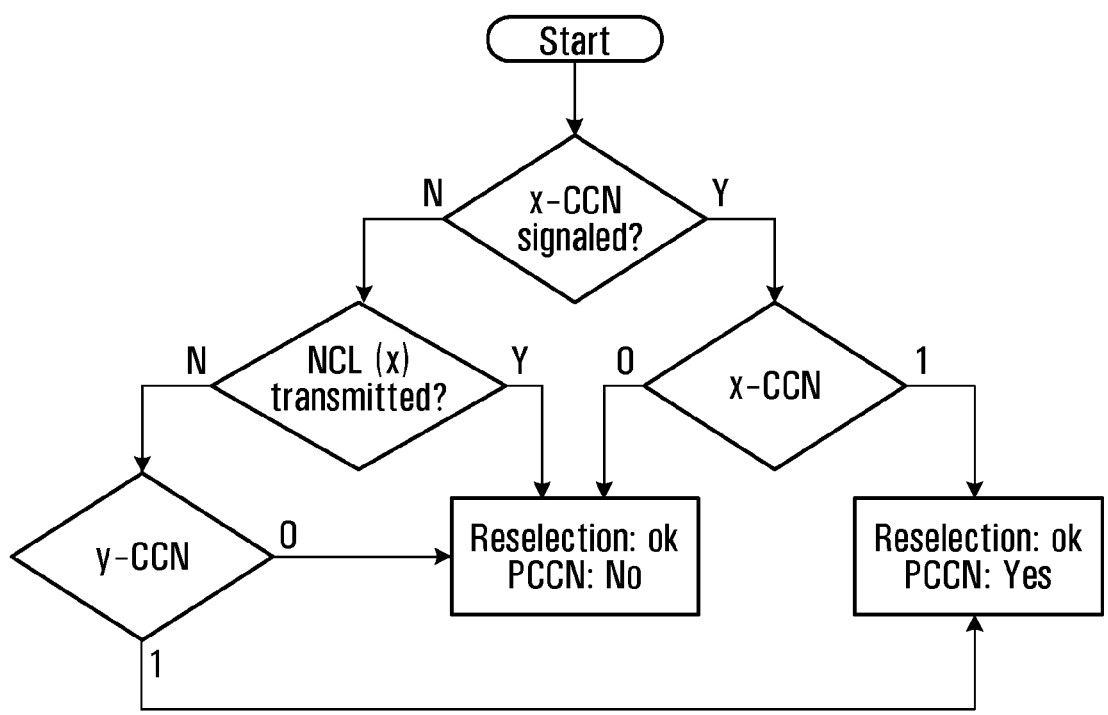

FIG. 12B is a logic flow that includes both the new behaviour of Example 8, sub-example 1 and the behaviour defined by current rules in respect of how the mobile station should operate if a CCN was received for the RAT of a CSG cell. In FIG. 12B, it is assumed that the RAT of the CSG cell is RAT-x, and that RAT-y is some other RAT. x-CON is a CCN for RAT-x, while y-CCN is a CCN for RAT-y. NCL(x) is the neighbour cell list for RAT-x.

Figure 13A:
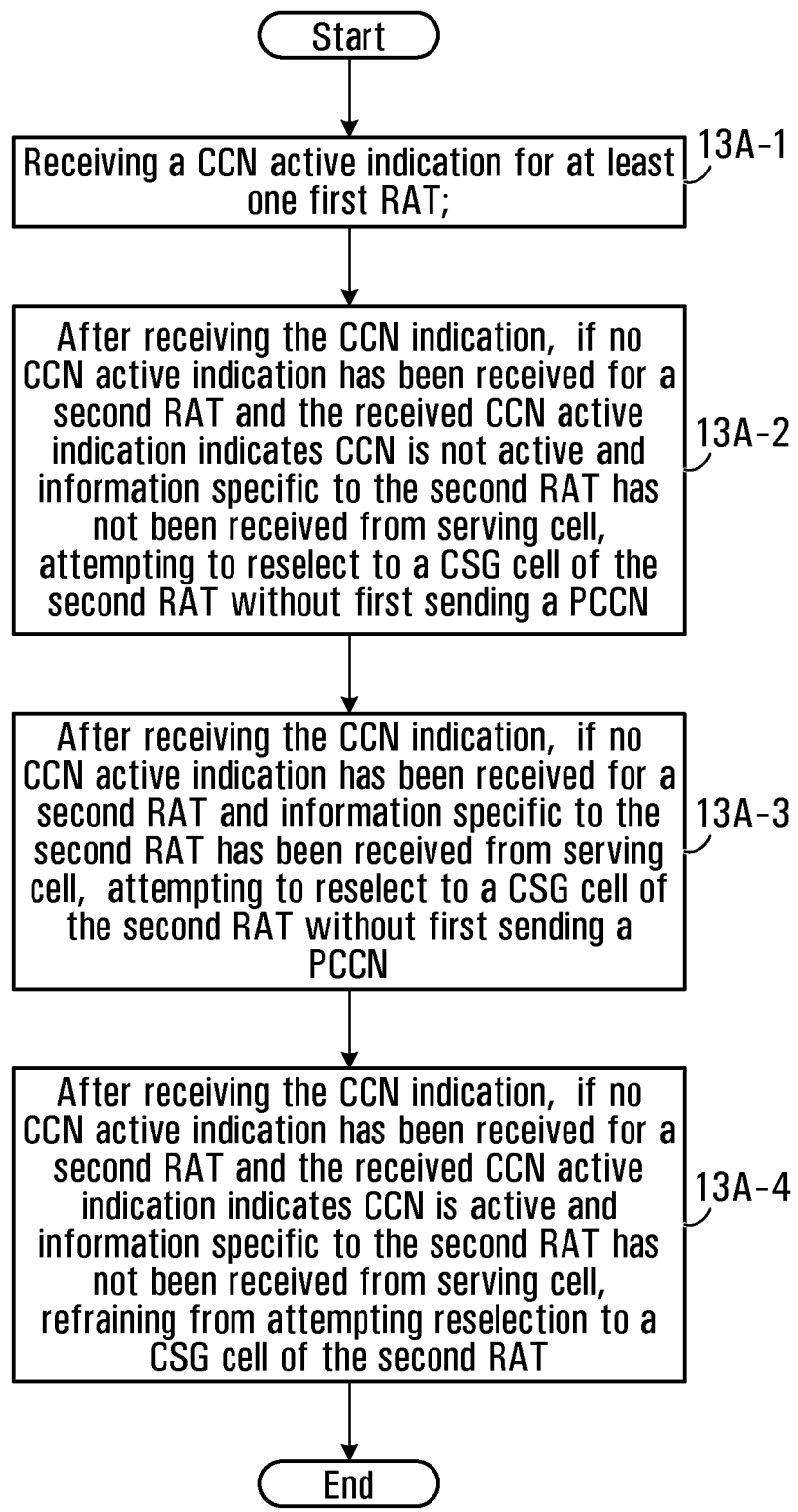

FIG. 13A is a flowchart of a method in a mobile station provided by an embodiment of the application that is based on Example 8, sub-example 2. The method begins in block 13A-1 with receiving a CCN active indication for at least one first RAT. In block 13A-2, dependent on at least in part that no CCN active indication has been received for a second RAT and the received CCN active indication indicates CCN is not active and dependent on at least in part that information specific to the second RAT has not been received from serving cell, the mobile station attempts to reselect to a CSG cell of the second RAT without first sending a PCCN. In block 13A-3, dependent on at least in part that no CCN active indication has been received for a second RAT and dependent on at least in part that information specific to the second RAT has been received from serving cell, the mobile station attempts to reselect to a CSG cell of the second RAT without first sending a PCCN.

In some embodiments, the method further includes block 13A-4 which involves if no CCN active indication has been received for a second RAT and the received CCN active indication indicates CCN is active and information specific to the second RAT has not been received from serving cell, the mobile station refraining from attempting reselection to a CSG cell of the second RAT.

Figure 13B:
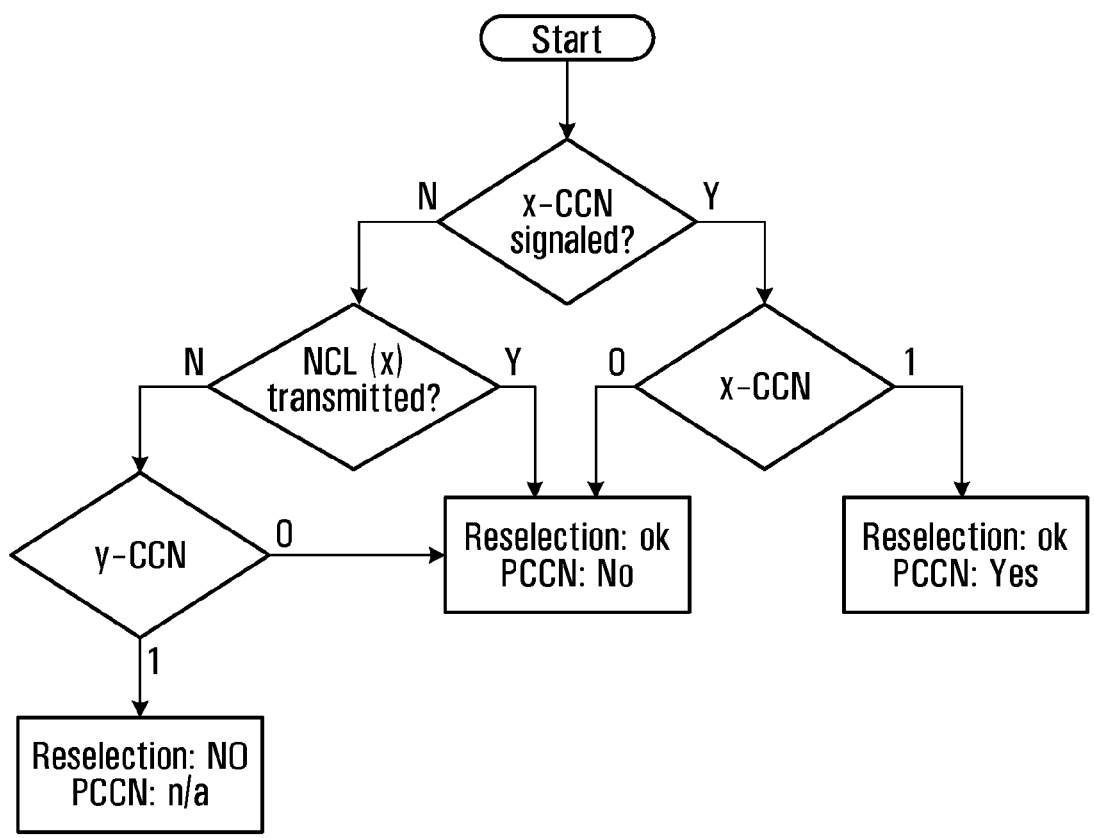
Figure 14:
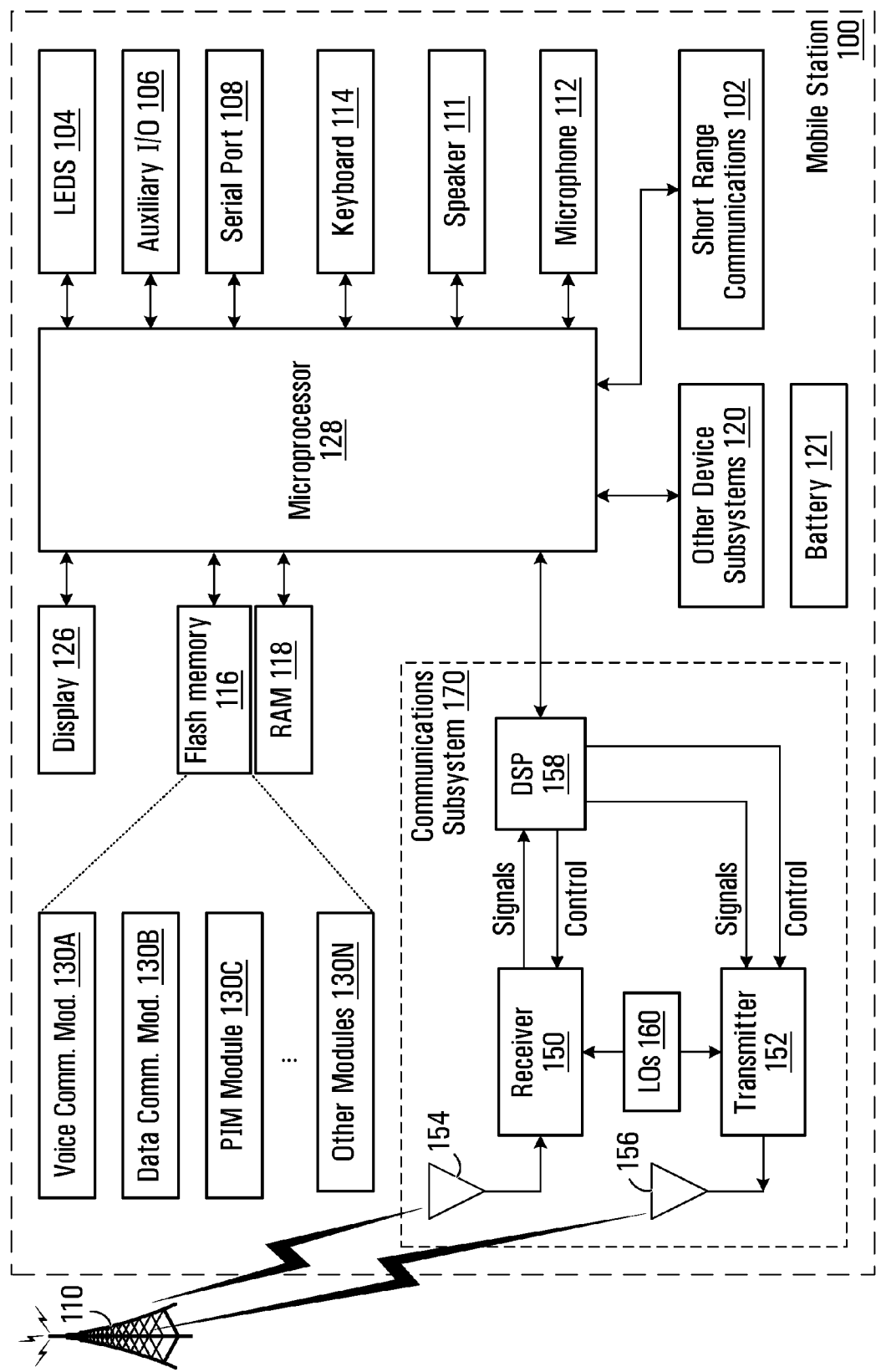
FIG. 14 is a block diagram of a mobile station.

FIG. 13B is a logic flow that includes both the new behaviour of Example 8, sub-example 2 and the behaviour defined by current rules in respect of how the mobile station should operate if a CCN was received for the RAT of a CSG cell. In FIG. 13B, it is assumed that the RAT of the CSG cell is RAT-x, and that RAT-y is some other RAT. x-CCN is a CCN for RAT-x, while y-CCN is a CCN for RAT-y. NCL(x) is the neighbour cell list for RAT-x.

Further aspects provide wireless networks, base stations, wireless devices that execute one or more of the methods summarized above or detailed herein. Another embodiment provides a computer readable medium having computer readable instructions for controlling the execution of one or more of the methods summarized above or detailed herein.

An embodiment provides that if E-UTRAN_CCN_ACTIVE is not provided or it indicates that CCN is disabled in the cell, the mobile station shall not follow the CCN procedures towards E-UTRAN cells. In addition, if E-UTRAN_CCN_ACTIVE is not provided, the mobile station shall not perform reselection towards E-UTRAN cells which are known to be CSG cells. E-UTRAN_CCN_ACTIVE can also be individually sent to the mobile station in either a PACKET MEASUREMENT ORDER, a PACKET CELL CHANGE ORDER or a PS HANDOVER COMMAND message. In the latter cases, the setting applies in the target cell.

An embodiment provides that if 3G_CCN_ACTIVE indicates that CCN is disabled in the cell, the mobile stations shall not follow the CCN procedures towards 3G cells. If 3G_CCN_ACTIVE is not provided, the mobile station shall not follow the CCN procedures towards 3G cells which are not known to be CSG cells; in this case, the mobile station shall not follow the CCN procedures towards 3G cells which are known to be CSG cells if CCN_ACTIVE indicates that CCN is disabled in the cell towards GSM cells 3G_CCN_ACTIVE can also be individually sent to the mobile station in either a PACKET MEASUREMENT ORDER, a PACKET CELL CHANGE ORDER message or a PS HANDOVER COMMAND. In the latter cases, the setting applies in the target cell; and if E-UTRAN_CCN_ACTIVE indicates that CCN is disabled in the cell, the mobile station shall not follow the CCN procedures towards E-UTRAN cells. If E-UTRAN_C- CN_ACTIVE is not provided, the mobile station shall not follow the CCN procedures towards E-UTRAN cells which are not known to be CSG cells; in this case, the mobile station shall not follow the CCN procedures towards E-UTRAN cells which are known to be CSG cells if either of CCN_ACTIVE or 3G_CCN_ACTIVE are provided and either or both indicate that CCN is disabled in the cell towards GSM (respectively 3G) cells. E-UTRAN_C- CN_ACTIVE can also be individually sent to the mobile station in either a PACKET MEASUREMENT ORDER, a PACKET CELL CHANGE ORDER or a PS HANDOVER COMMAND message. In the latter cases, the setting applies in the target cell.

An embodiment provides that if 3G_CCN_ACTIVE indicates that CCN is disabled in the cell, the mobile stations shall not follow the CCN procedures towards 3G cells. If 3G_CCN_ACTIVE is not provided, the mobile station shall not follow the CCN procedures towards 3G cells which are not known to be CSG cells. If 3G_CCN_ACTIVE is not provided and the mobile station has received a 3G neighbour cell list or 3G frequency list valid in the current cell the mobile station shall not follow the CCN procedures towards 3G cells which are known to be CSG cells. If 3G_CCN_AC- TIVE is not provided and the mobile station has not received either a 3G neighbour cell list or 3G frequency list valid in the current cell then mobile station shall follow the CCN procedures towards 3G cells which are known to be CSG cells if and only if CCN_ACTIVE indicates that CCN is enabled in the cell towards 2G cells. 3G_CCN_ACTIVE can also be individually sent to the mobile station in either a PACKET MEASUREMENT ORDER, a PACKET CELL CHANGE ORDER message or a PS HANDOVER COMMAND. In the latter cases, the setting applies in the target cell; and if E-UTRAN_CCN_ACTIVE indicates that CCN is disabled in the cell, the mobile station shall not follow the CCN procedures towards E-UTRAN cells. If E-UTRAN_C- CN_ACTIVE is not provided, the mobile station shall not follow the CCN procedures towards E-UTRAN cells which are not known to be CSG cells and shall follow the CCN procedures towards E-UTRAN cells which are known to be CSG cells if and only if both CCN_ACTIVE and 3G_CCN_ACTIVE (if provided) indicate that CCN is enabled in the cell towards GSM (respectively 3G) cells. E-UTRAN_CCN_ACTIVE can also be individually sent to the mobile station in either a PACKET MEASUREMENT ORDER, a PACKET CELL CHANGE ORDER or a PS HANDOVER COMMAND message. In the latter cases, the setting applies in the target cell.

An embodiment provides that reselection to E-UTRAN (respectively UTRAN) CSG cells is not permitted during packet transfer mode unless the mobile station has received an E-UTRAN_CCN_ACTIVE indication (respectively 3G_CCN_ACTIVE indication) valid for the serving cell (see 3GPP TS 44.060).

An embodiment provides that a multi-RAT MS supporting UTRAN and/or E-UTRAN shall not send any measurement reports for cells that are known to be UTRAN/E- UTRAN CSG cells other than in a PACKET CELL CHANGE NOTIFICATION message for a CSG cell which is the proposed target cell (see sub-clause 8.8.3).

Another Mobile Station

Referring now to FIG. 4, shown is a block diagram of another wireless device 100 that may implement any of the device methods described in this disclosure. The wireless device 100 is shown with specific components for implementing features similar to those of the mobile station 30 of FIG. 1. It is to be understood that the wireless device 100 is shown with very specific details for exemplary purposes only.

A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In FIG. 4, a CSG cell reselector (not shown) is provided to implement any one or combination of the methods described herein. This might, for example, be implemented as processor code stored in flash memory 116, or other memory, for execution by the microprocessor 128.

Application to Cell Classes Other than CSG Cells

The embodiments described have been specific to reselection to CSG cells. In another embodiment, any of the embodiments described herein may be used to control reselection to another class of cells (for example those associated with a specific RAT) without seeing a neighbour cell list. The feature of CSGs that makes them problematic here is that the mobile station is permitted to perform autonomous reselection to them without there needing to be any related signalling (in particular, neighbour cell list) having been received. In general, it might be expected that reselection to any other RAT requires a neighbour cell list, however this might not be the case, especially for non-3GPP technologies; also, there is a trend to minimizing the amount of NCL information transmitted (e.g. for E-UTRAN, the NCL is actually just a list of frequencies on which cells may be operating).

Numerous modifications and variations of the present application are possible in light of the above teachings. It is therefore to be understood that within the scope of the appended claims, the application may be practised otherwise than as specifically described herein.

The invention claimed is:

1. A method in a mobile station, the method comprising:
receiving a CCN (cell change notification) active indication for at least one first RAT (radio access technology), wherein a plurality of received CCN active indications includes the received CCN active indication;
the mobile station determining that no CCN active indication has been received for a second RAT other than the at least one first RAT;
the mobile station determining whether reselection to CSG CLOSED SUBSCRIBER GROUP cells is allowed;
the mobile station determining whether each of the received CCN active indications for the at least one first RAT indicates that CCN is active; and
in response to determining that no CCN active indication has been received for the second RAT:
sending a PCCN (packet cell change notification) proposing reselection to a CSG (closed subscriber group) cell of the second RAT in response to determining that each of the received CCN active indication for the at least one first RAT indicates that CCN is active; and
attempting to reselect to a CSG cell of the second RAT without first sending a PCCN in response to determining that any received CCN active indication for the at least one first RAT indicates that CCN is not active.

2. The method of claim 1, further comprising:
ascertaining the presence or absence of at least one field of a received signalling message pertaining to the second RAT other than a CCN active indication for the second RAT;
wherein said determining is also based at least in part on the ascertained presence or absence of at least one field of a received signalling message pertaining to the second RAT other than a CCN active indication.

3. The method of claim 2, wherein:
the at least one predetermined field comprises at least one IE specific to the second RAT of the candidate cell but which does not include the CCN active indication for that RAT.

4. The method of claim 3, wherein ascertaining and determining comprise:
dependent on at least in part that each received CCN active indication indicates CCN is not active, prohibiting the performance of cell reselection to a CSG cell of the second RAT;
dependent on at least in part that any of received CCN active indication indicates CCN is active:
determining that cell reselection to a CSG cell of the second RAT is allowed;
ascertaining the presence or absence of at least one field of a received signalling message pertaining to the second RAT other than a CCN active indication; and
selecting between transmitting a PCCN and not transmitting a PCCN based on the ascertained presence or absence of the at least one field of the received signalling message pertaining to the second RAT other than a CCN active indication.

5. A non-transitory computer readable medium coupled to the one or more processors and storing programming instructions for execution by the one or more processors, the programming instructions instruct the one or more processors to:
receiving a CCN (cell change notification) active indication for at least one first RAT (radio access technology), wherein a plurality of received CCN active indications includes the received CCN active indication;
determining that no CCN active indication has been received for a second RAT other than the at least one first RAT;
determining whether reselection to CSG CLOSED SUBSCRIBER GROUP cells is allowed;
determining whether each of the received CCN active indications for the at least one first RAT indicates that CCN is active; and
in response to determining that no CCN active indication has been received for the second RAT:
sending a PCCN (packet cell change notification) proposing reselection to a CSG (closed subscriber group) cell of the second RAT in response to determining that each of the received CCN active indication for the at least one first RAT indicates that CCN is active; and attempting to reselect to a CSG cell of the second RAT without first sending a PCCN in response to determining that any received CCN active indication for the at least one first RAT indicates that CCN is not active.

6. The computer readable medium of claim 5, the operations further comprising:

ascertaining the presence or absence of at least one field of a received signalling message pertaining to the second RAT other than a CCN active indication for the second RAT;

wherein said determining is also based at least in part on the ascertained presence or absence of at least one field of a received signalling message pertaining to the second RAT other than a CCN active indication.

7. The computer readable medium of claim 6, wherein:

the at least one predetermined field comprises at least one IE specific to the second RAT of the candidate cell but which does not include the CCN active indication for that RAT.

8. The computer readable medium of claim 7, wherein ascertaining and determining comprise:

dependent on at least in part that each received CCN active indication indicates CCN is not active, the operations further comprising prohibiting the performance of cell reselection to a CSG cell of the second RAT;

dependent on at least in part that any of received CCN active indication indicates CCN is active, the operations further comprising:

determining that cell reselection to a CSG cell of the second RAT is allowed;

ascertaining the presence or absence of at least one field of a received signalling message pertaining to the second RAT other than a CCN active indication; and selecting between transmitting a PCCN and not transmitting a PCCN based on the ascertained presence or absence of the at least one field of the received signalling message pertaining to the second RAT other than a CCN active indication.

9. A mobile device, comprising:

one or more processors; and a non-transitory computer-readable storage medium coupled to the one or more processors and storing programming instructions for execution by the one or more processors, the programming instructions instruct the one or more processors to:

receive a CCN (cell change notification) active indication for at least one first RAT (radio access technology), wherein a plurality of received CCN active indications includes the received CCN active indication;

determine that no CCN active indication has been received for a second RAT other than the at least one first RAT;

determine whether reselection to CSG CLOSED SUBSCRIBER GROUP cells is allowed;

determine whether each of the received CCN active indications for the at least one first RAT indicates that CCN is active; and in response to determining that no CCN active indication has been received for the second RAT, the instructions further instruct the one or more processors to:

send a PCCN (packet cell change notification) proposing reselection to a CSG (closed subscriber group) cell of the second RAT in response to determining that each of the received CCN active indication for the at least one first RAT indicates that CCN is active; and attempt to reselect to a CSG cell of the second RAT without first sending a PCCN in response to determining that any received CCN active indication for the at least one first RAT indicates that CCN is not active.

10. The mobile device of claim 9, the instructions further instruct the one or more processors to:

ascertain the presence or absence of at least one field of a received signalling message pertaining to the second RAT other than a CCN active indication for the second RAT;

wherein said determining is also based at least in part on the ascertained presence or absence of at least one field of a received signalling message pertaining to the second RAT other than a CCN active indication.

11. The mobile device of claim 10, wherein:

the at least one predetermined field comprises at least one IE specific to the second RAT of the candidate cell but which does not include the CCN active indication for that RAT.

12. The mobile device of claim 11, wherein ascertaining and determining comprise:

dependent on at least in part that each received CCN active indication indicates CCN is not active, the instructions further instruct the one or more processors to prohibit the performance of cell reselection to a CSG cell of the second RAT;

dependent on at least in part that any of received CCN active indication indicates CCN is active, the instructions further instruct the one or more processors to:

determine that cell reselection to a CSG cell of the second RAT is allowed;

ascertain the presence or absence of at least one field of a received signalling message pertaining to the second RAT other than a CCN active indication; and select between transmitting a PCCN and not transmitting a PCCN based on the ascertained presence or absence of the at least one field of the received signalling message pertaining to the second RAT other than a CCN active indication.

* * * * *